(12) United States Patent
Yamane et al.

(10) Patent No.: US 8,296,789 B2
(45) Date of Patent: Oct. 23, 2012

(54) CHUCKING DEVICE, MOTOR, DISK DRIVE APPARATUS AND CHUCKING DEVICE MANUFACTURING METHOD

(75) Inventors: Takuya Yamane, Kyoto (JP); Haruhiko Ito, Kyoto (JP); Hisakazu Motomochi, Kyoko (JP); Shigeo Hayashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/092,521

(22) Filed: Apr. 22, 2011

(65) Prior Publication Data

US 2011/0271292 A1    Nov. 3, 2011

(30) Foreign Application Priority Data

Apr. 28, 2010 (JP) ................................ 2010-103079
Oct. 26, 2010 (JP) ................................ 2010-239568

(51) Int. Cl.
*G11B 17/028* (2006.01)
(52) U.S. Cl. ....................................................... 720/708
(58) Field of Classification Search .................. 720/708, 720/714, 709, 665, 619, 663, 712, 707, 696, 720/713, 675
See application file for complete search history.

(56) References Cited

U.S. PATENT DOCUMENTS

| | | | |
|---|---|---|---|
| 6,198,715 B1 | 3/2001 | Kouno et al. | |
| 6,256,289 B1 | 7/2001 | Miyamoto | |
| 6,351,352 B1 * | 2/2002 | Khan et al. | 360/264.2 |
| 6,512,315 B1 * | 1/2003 | Yamaguchi | 310/51 |
| 2009/0064212 A1 | 3/2009 | Ito et al. | |
| 2011/0167436 A1 | 7/2011 | Ito et al. | |
| 2011/0202940 A1 | 8/2011 | Ito et al. | |

FOREIGN PATENT DOCUMENTS

| | | |
|---|---|---|
| JP | 3045377 U | 1/1998 |
| JP | 10-092094 A | 4/1998 |
| JP | 2000-014113 A | 1/2000 |
| JP | 2000-245116 A | 9/2000 |
| JP | 2001-037141 A | 2/2001 |
| JP | 2003-299302 A | 10/2003 |
| JP | 2004-064865 A | 2/2004 |
| JP | 2006-079727 A | 3/2006 |
| JP | 2009-059410 A | 3/2009 |

OTHER PUBLICATIONS

Copending U.S. Appl. No. 12/984,698 by Ito et al. filed on Jan. 5, 2011.
Copending U.S. Appl. No. 13/026,814 by Ito et al. filed on Feb. 14, 2011.

* cited by examiner

*Primary Examiner* — Allen Cao
(74) *Attorney, Agent, or Firm* — Westerman, Hattori, Daniels & Adrian, LLP

(57) ABSTRACT

In a chucking device, a rolling guide portion is arranged below an upper cover portion of a rotor holder and radially inwards of a cylinder portion of the rotor holder. This helps restrain the noises generated by the rolling movement of balls from propagating to the outside. Moreover, the turntable and the rolling guide portion are formed of a single resin member extending continuously through a through-hole defined in the rotor holder.

38 Claims, 27 Drawing Sheets

Fig.5

CHUCKING DEVICE, MOTOR, DISK DRIVE APPARATUS AND CHUCKING DEVICE MANUFACTURING METHOD

BACKGROUND OF THE INVENTION

1. Field of the Invention

The present invention relates to a chucking device, a motor, a disk drive apparatus and a chucking device manufacturing method.

2. Description of the Related Art

A brushless motor for rotating a disk is mounted to a disk drive apparatus such as an optical disk drive or the like. The brushless motor includes a chucking device rotating together with a rotary unit. The disk drive apparatus causes rotation of the disk by driving the brushless motor while keeping the disk held with the chucking device.

In recent years, the rotation speed of a brushless motor tends to become higher along with the increase in the operation speed of a disk drive apparatus. If the brushless motor rotates faster, vibration is likely to occur during operation of the brushless motor. One of causes of the vibration generated in the brushless motor is the deviation in the gravity center of a disk. The position of the gravity center of a disk differs slightly from disk to disk. The vibration at issue is prone to occur in the event that the gravity center of the rotary unit and the disk as a whole does not coincide with the rotation center of the brushless motor.

Conventionally, as one example of the techniques for correcting the deviation in the gravity center, a motor in which a plurality of balls as balancing bodies is accommodated within an annular space defined between a positioning member having a U-shape in cross section and a turntable of a rotor. As another example, a motor in which a plurality of balls as balancing bodies is movably arranged within an annular movement space defined by a case body and a cover arranged in the upper space inside a rotor body. In the conventional structures, attempts are made to eliminate weight unbalance by moving the balls as balancing bodies during high-speed rotation.

In the conventional structures, press-fit or adhesive fixing is used as a method of fixing the positioning member or the case body to the rotor or the rotor body. Use of either the press-fit or the adhesive fixing can achieve the fixing strength generally required in a brushless motor. In order to provide a brushless motor of higher quality, there is a need to further enhance the fixing strength. Further, there is a need to restrain the noises generated by the rolling movement of balls.

SUMMARY OF THE INVENTION

In accordance with a first aspect of the invention, there is provided a chucking device, including: a rotor holder including a upper cover portion extending radially with respect to a vertically-extending center axis and a cylinder portion extending downwards from the outer edge of the upper cover portion; a turntable positioned above the upper cover portion and arranged to directly or indirectly support a disk from below;

an annular rolling guide portion including a top panel portion contiguous to the lower surface of the upper cover portion and an outer wall portion contiguous to the inner circumferential surface of the cylinder portion of the rotor holder; a closing member arranged to close the rolling guide portion from below; and a plurality of balls positioned within an annular space surrounded by the rolling guide portion and the closing member to make rolling movement in a circumferential direction, wherein the turntable and the rolling guide portion are formed of a single resin member extending continuously through a through-hole defined in the rotor holder.

In accordance with a second aspect of the invention, there is provide a method for manufacturing a chucking device with a plurality of circumferentially-rolling balls, the method including: disposing a rotor holder within a cavity defined between a pair of molds, the rotor holder including an upper cover portion extending radially with respect to a vertically-extending center axis and a cylinder portion extending downwards from the outer edge of the upper cover portion, at least one of the upper cover portion and the cylinder portion including a through-hole; allowing a liquid resin to flow into the cavity; solidifying the resin in the cavity to produce a resin member unified with the rotor holder; and opening the molds and removing the rotor holder and the resin member unified together from the molds, wherein the resin member includes a turntable positioned above the upper cover portion and a substantially annular rolling guide portion, the rolling guide portion including a top panel portion joined to the turntable through the through-hole and contiguous to the lower surface of the upper cover portion and an outer wall portion contiguous to the inner circumferential surface of the cylinder portion of the rotor holder.

With such configuration, the rolling guide portion is arranged below the upper cover portion of the rotor holder and radially inwards of the cylinder portion. Moreover, the turntable and the rolling guide portion extend continuously through the through-hole.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a partial vertical section view of the rotary unit.

DETAILED DESCRIPTION OF THE PREFERRED EMBODIMENTS

Hereinafter, preferred embodiments of the present invention will now be described with reference to the accompanying drawings. In describing the shape and positional relationship of individual members herein below, the direction running along the center axis of a motor will be referred to as "vertical direction" and the side of a turntable at which a disk is arranged will be referred to as "upper". However, these definitions are presented merely for the sake of convenience in description and are not intended to limit the in-use postures of the present chucking device, the present motor and the present disk drive apparatus.

1. Chucking Device of One Preferred Embodiment

Figure 1:
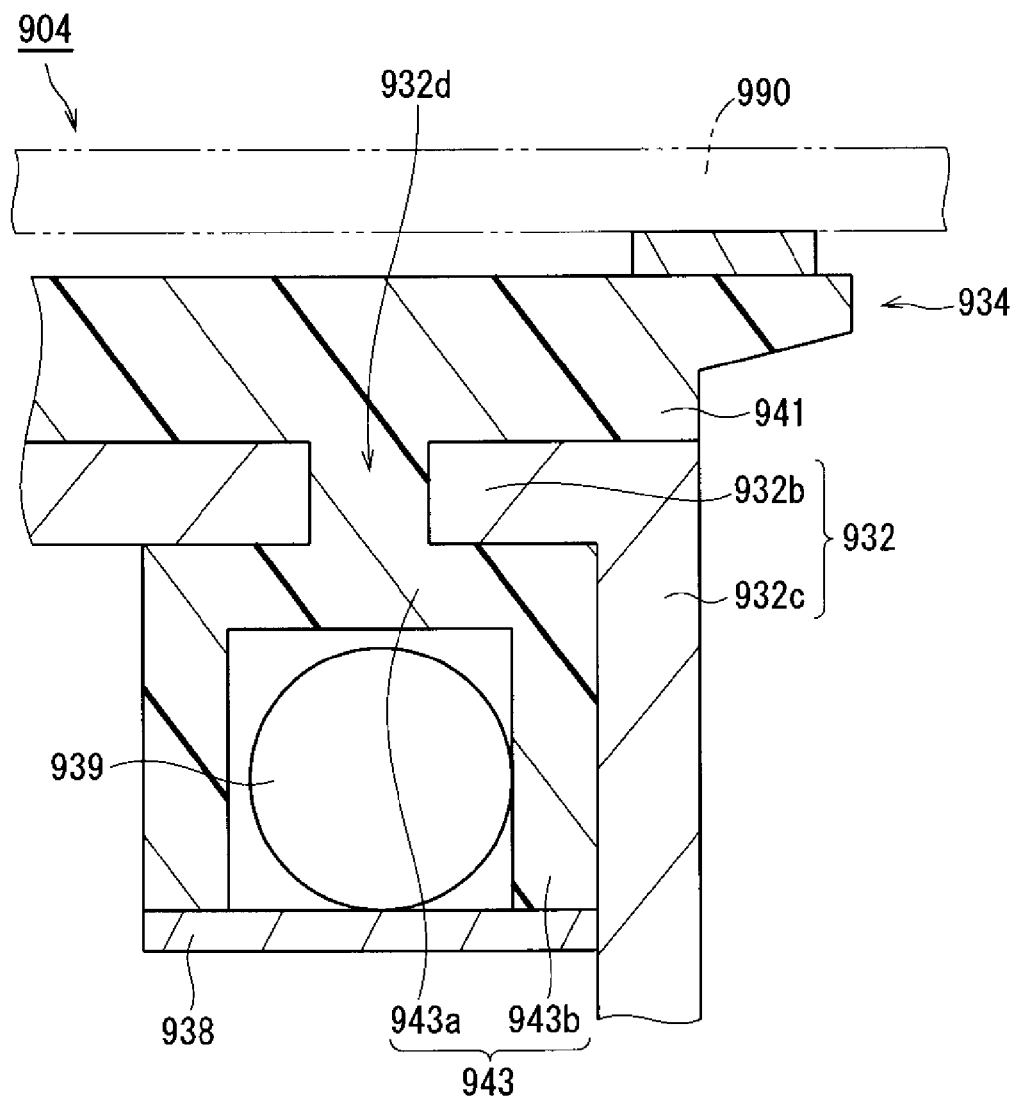
FIG. 1 is a partial vertical section view showing a chucking device in accordance with one preferred embodiment of the present invention.

FIG. 1 is a partial vertical section view showing a chucking device 904 according to one preferred embodiment of the present invention. As shown in FIG. 1, the chucking device 904 preferably includes a rotor holder 932, a turntable 941, a rolling guide portion 943, a closing member 938 and a plurality of balls 939.

The rotor holder 932 preferably includes an upper cover portion 932b and a cylinder portion 932c. The upper cover portion 932b is a portion extending radially with respect to a vertically-extending center axis. The cylinder portion 932c is a portion extending downwards from the outer edge of the upper cover portion 932b. A through-hole 932d is defined in the rotor holder 932.

The turntable 941 is arranged above the upper cover portion 932b. The turntable 941 is a portion directly or indirectly supporting a disk 990 from below. The rolling guide portion 943 is an annular portion including a top panel portion 943a contiguous to the lower surface of the upper cover portion 932b and an outer wall portion 943b contiguous to the inner circumferential surface of the cylinder portion 932c. The turntable 941 and the rolling guide portion 943 make up portions of a single resin member 934 continuously extending through the through-hole 932d.

The closing member 938 is a member arranged to close the rolling guide portion 943 from below. The balls 939 are arranged within an annular space surrounded by the rolling guide portion 943 and the closing member 938 to make rolling movement in a circumferential direction.

When manufacturing the chucking device 904, the rotor holder 932 is first disposed within a cavity defined between a pair of molds. Then, a liquid resin is allowed to flow into the cavity. Subsequently, the liquid resin is solidified within the cavity, thus producing a resin member 934 unified with the rotor holder 932. At this time, the turntable 941 and the rolling guide portion 943 are formed as portions of the resin member 934. Thereafter, the molds are opened to remove the rotor holder 932 and the resin member 934 unified together from the molds.

In the chucking device 904 of the present preferred embodiment, the rolling guide portion 943 is arranged below the upper cover portion 932b of the rotor holder 932 and radially inwards of the cylinder portion 932c. Thus, the noises generated by the rolling movement of the balls 939 are restrained from propagating to the outside. Moreover, the turntable 941 and the rolling guide portion 943 extend continuously through the through-hole 932d. Thus, the turntable 941 and the rolling guide portion 943 are strongly fixed to the rotor holder 932.

2. Specific Preferred Embodiment

<2-1. Configuration of Disk Drive Apparatus>

Next, description will be made on a specific preferred embodiment of the present invention.

Figure 2:
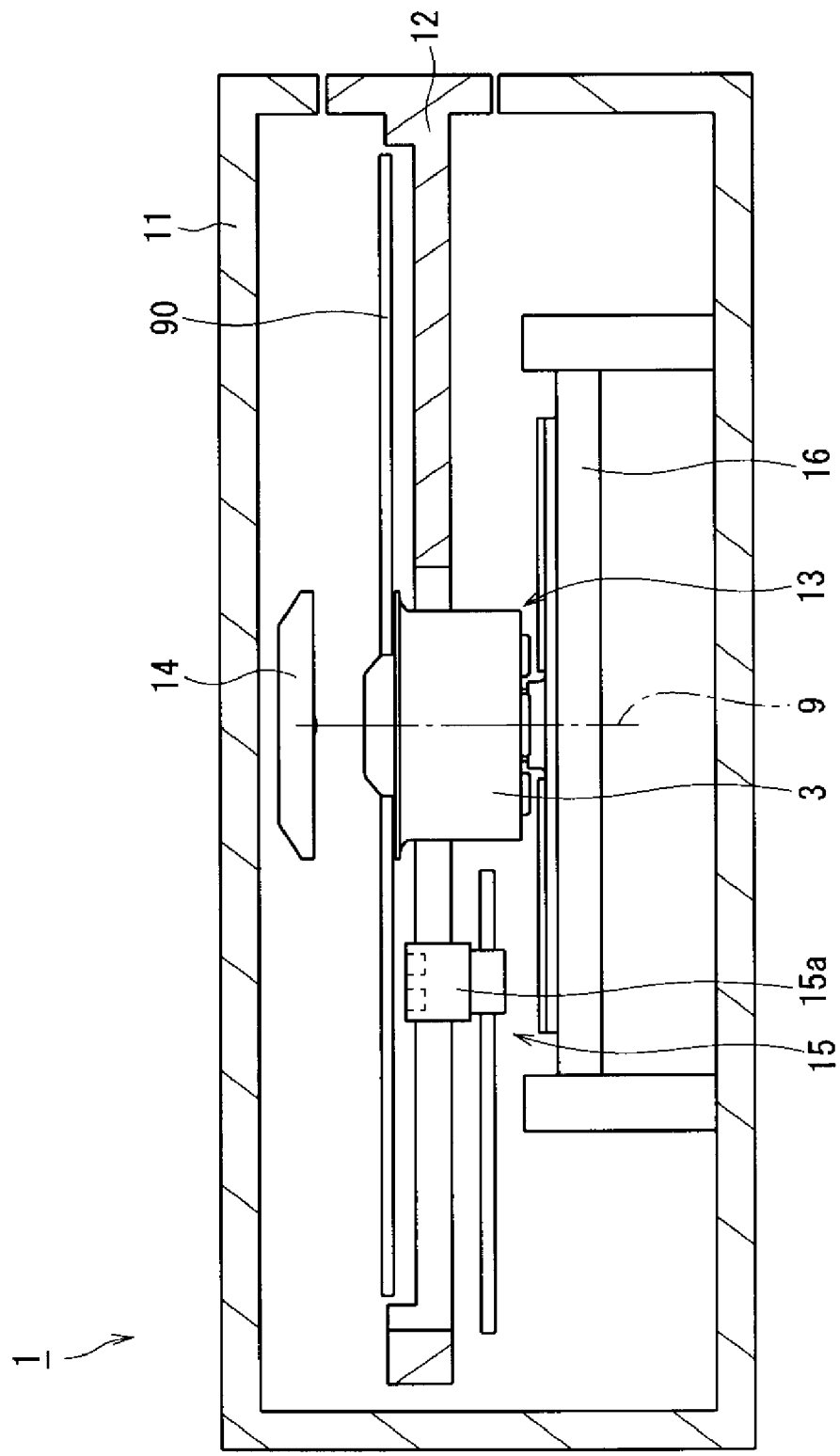
FIG. 2 is a vertical section view showing a disk drive apparatus in accordance with one preferred embodiment of the present invention.

FIG. 2 is a vertical section view showing a disk drive apparatus 1. The disk drive apparatus 1 is an apparatus designed to perform information reading and/or writing tasks with respect to an optical disk 90 (hereinafter just referred to as "disk 90") while rotating the disk 90. The disk drive apparatus 1 preferably includes an apparatus housing 11, a disk tray 12, a brushless motor 13, a clamper 14 and an access unit 15.

The apparatus housing 11 is a frame arranged to accommodate the disk tray 12, the brushless motor 13, the clamper 14 and the access unit 15 therein. The disk tray 12 is a mechanism arranged to transfer the disk 90 between the inside and the outside of the apparatus housing 11. The brushless motor 13 is fixed to a chassis 16 provided within the apparatus housing 11. The disk 90 is conveyed to the brushless motor 13 by the disk tray 12. The disk 90 is held between the rotary unit 3 of the brushless motor 13 and the clamper 14. Thereafter, the disk 90 is rotated about a center axis 9 by the brushless motor 13.

The access unit 15 preferably includes a head 15a having an optical pickup function. The access unit 15 performs information reading and writing tasks with respect to the disk 90 by moving the head 15a along the recording surface of the disk 90 held on the brushless motor 13. Alternatively, the access unit 15 may perform only one of the information reading and writing tasks with respect to the disk 90.

<2-2. Configuration of Brushless Motor>

Next, description will be made on the configuration of the brushless motor 13.

Figure 3:
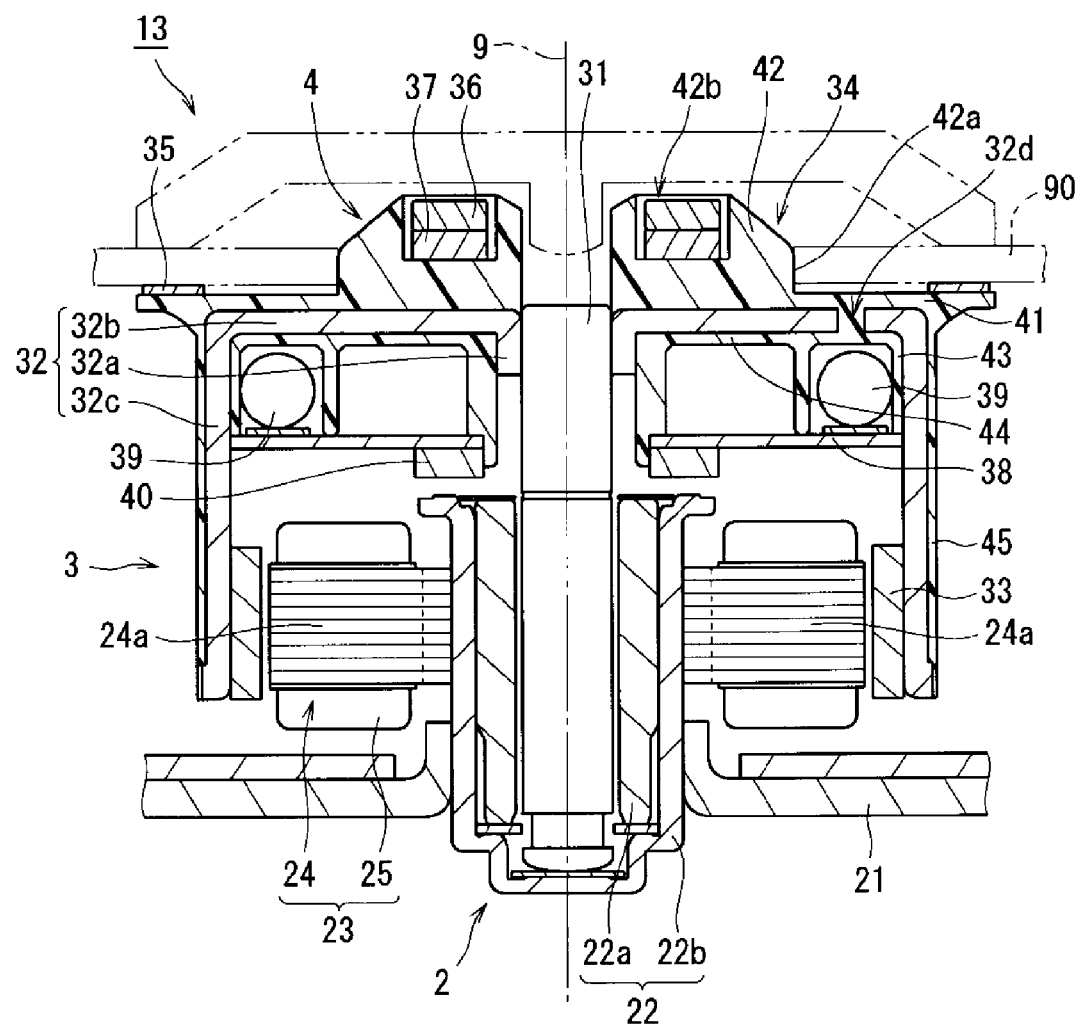
FIG. 3 is a vertical section view showing a brushless motor.

FIG. 3 is a vertical section view showing the brushless motor 13. As shown in FIG. 3, the brushless motor 13 preferably includes a stationary unit 2 and a rotary unit 3. The stationary unit 2 is fixed to the chassis 16 of the disk drive apparatus 1. The rotary unit 3 is rotatably supported with respect to the stationary unit 2.

The stationary unit 2 preferably includes a base member 21, a stationary bearing unit 22 and a stator unit 23. The stationary bearing unit 22 is a mechanism arranged to rotatably support a shaft 31. The stationary bearing unit 22 preferably includes a sleeve 22*a* and a sleeve housing 22*b*. The sleeve 22*a* is a substantially cylindrical member arranged to surround the outer circumferential surface of the shaft 31. The sleeve housing 22*b* is a substantially cup-shaped member arranged to accommodate the sleeve 22*a* therein. The sleeve housing 22*b* is fixed to the base member 21. The stator unit 23 preferably includes a stator core 24 having a plurality of tooth portions 24*a*, and coils 25 wound around the respective tooth portions 24*a*. The stator unit 23 is fixed to the outer circumferential surface of the sleeve housing 22*b*.

The rotary unit 3 preferably includes a shaft 31, a rotor holder 32, a rotor magnet 33, a resin member 34, a disk support member 35, a clamp magnet 36, a yoke 37, a closing member 38, a plurality of balls 39 and a preload magnet 40.

In the present preferred embodiment, at least the shaft 31, the rotor holder 32, the resin member 34, the disk support member 35, the yoke 37, the closing member 38 and the balls 39 of the rotary unit 3 make up a chucking device 4 arranged to hold the disk 90 in place.

Figure 4:
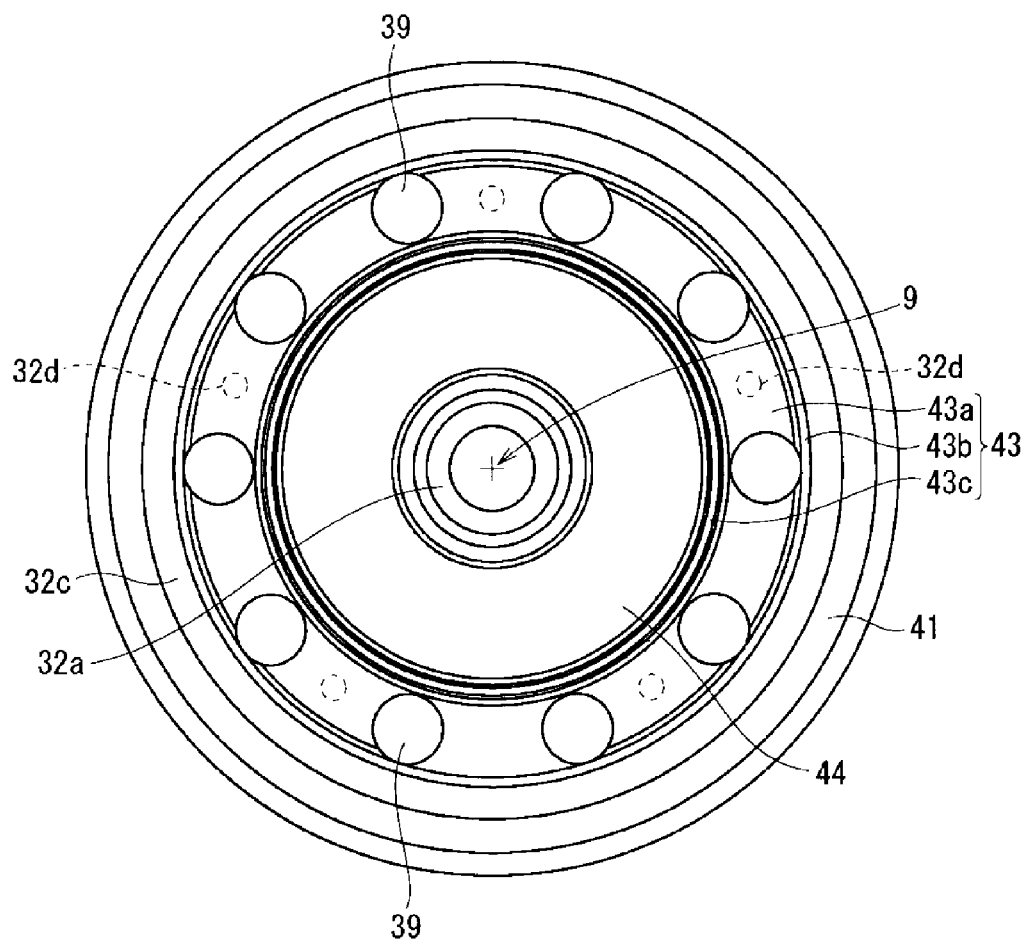
FIG. 4 is a bottom view of a rotary unit, showing a rotor holder, a resin member and a plurality of balls.
Figure 5:
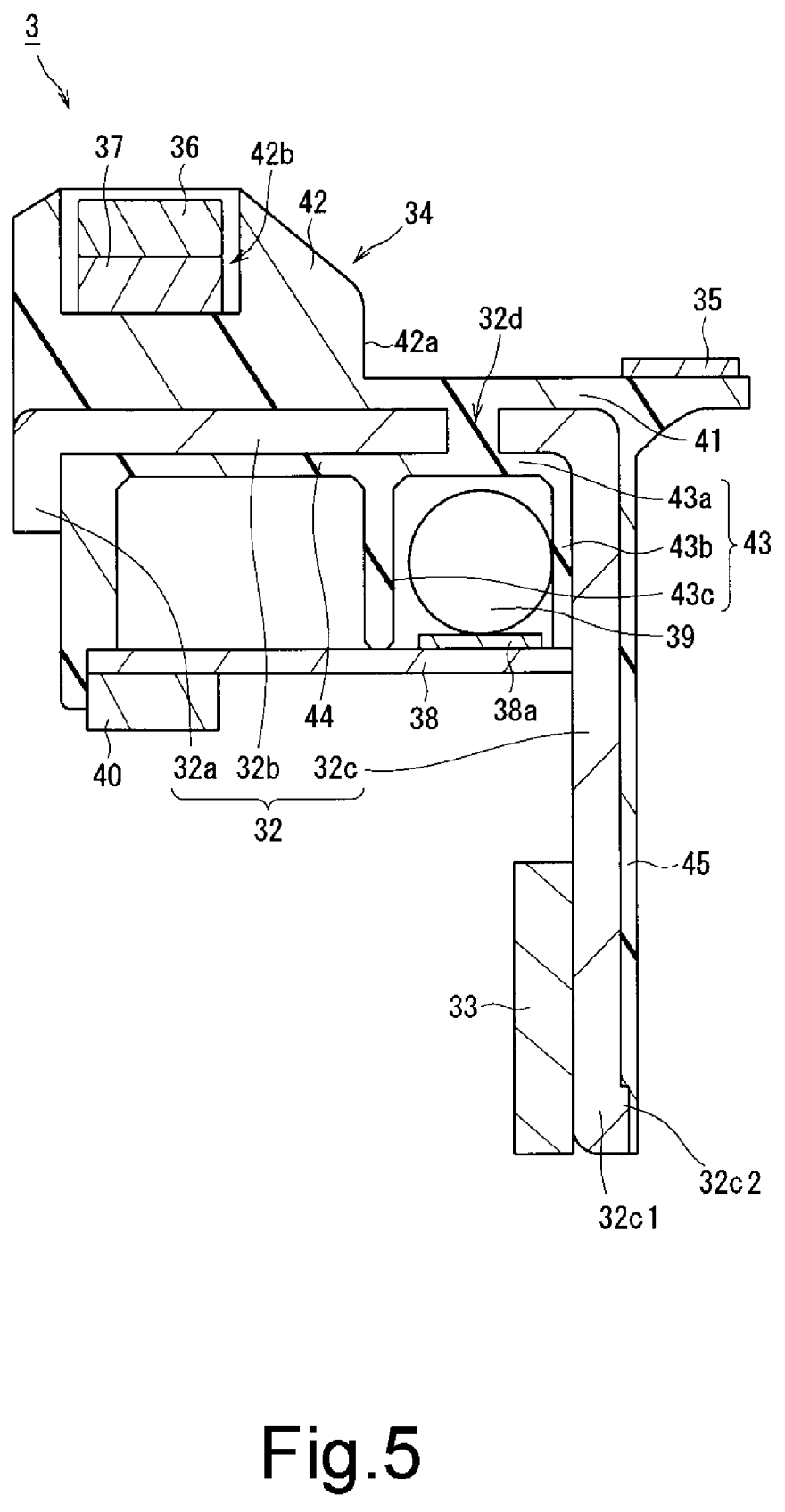

FIG. 4 is a bottom view showing the rotor holder 32, the resin member 34 and the balls 39 of the rotary unit 3. FIG. 5 is a partial vertical section view of the rotary unit 3. The following description will be made by appropriately referring to FIGS. 4 and 5 as well as FIG. 3.

The shaft 31 is a substantially columnar member vertically extending along the center axis 9. The rotor holder 32 is a member fixed to the shaft 31 for rotation with the shaft 31. The rotor holder 32 is made of a metal, e.g., a zinc-coated steel plate. The rotor holder 32 is produced by press-forming a metal plate or the like. Alternatively, the rotor holder 32 may be produced by cutting or other methods.

The rotor holder 32 preferably includes a fastening portion 32*a*, an upper cover portion 32*b* and a cylinder portion 32*c*. The fastening portion 32*a* has a substantially cylindrical shape and is fastened to the shaft 31 by press-fit. The upper cover portion 32*b* has a substantially disk-like shape and extends radially outwards from the upper end of the fastening portion 32*a*. The cylinder portion 32*c* has a substantially cylindrical shape and extends downwards from the radial outer edge of the upper cover portion 32*b*. The cylinder portion 32*c* is arranged in a coaxial relationship with the center axis 9. The cylinder portion 32*c* is provided at its lower end with an end portion 32*c*1. A protrusion portion 32*c*2 protruding radially outwards beyond the outer circumferential surface of the cylinder portion 32*c* is formed at the radial outer side of the end portion 32*c*1. The protrusion portion 32*c*2 is formed by severing the rotor holder 32 from a plate-shaped member when the latter is subjected to press-forming.

In the present preferred embodiment, the upper cover portion 32*b* of the rotor holder 32 has a plurality of through-holes 32*d*. As shown in FIGS. 3 and 5, the through-holes 32*d* are pierced to extend in the axial direction of the upper cover portion 32*b* (or in the direction parallel to the center axis 9, which definition equally applies in the following description). As can be seen in FIG. 4, the through-holes 32*d* are arranged at an equal interval in the circumferential direction. In order to reduce the deviation in gravity center of the rotor holder 32, it is preferred that the through-holes 32*d* be arranged at an equal interval in the circumferential direction. However, the through-holes 32*d* may not always be arranged at an equal interval in the circumferential direction. Alternatively, the through-holes 32*d* may be arranged at irregular intervals.

The rotor magnet 33 is an annular permanent magnet. The rotor magnet 33 is fixed to the inner circumferential surface of the cylinder portion 32*c* of the rotor holder 32. The inner circumferential surface of the rotor magnet 33 is a magnetic pole surface radially opposing to the end surfaces of the tooth portions 24*a* of the stator core 24.

The resin member 34 is made of a resin. Polycarbonate or other resins may be used as the material of the resin member 34. The resin member 34 is integrally molded with the rotor holder 32 by the insert-molding to be set forth below. As shown in FIGS. 3 through 5, the resin member 34 preferably includes a turntable 41, a disk guide portion 42, a rolling guide portion 43, an inner annular portion 44 and a covering portion 45.

The turntable 41 is arranged above the upper cover portion 32*b* and radially outwards of the disk guide portion 42. The through-holes 32*d* mentioned above are arranged under the turntable 41. The radial outer end of the turntable 41 protrudes radially outwards beyond the cylinder portion 32*c* of the rotor holder 32.

An annular disk support member 35 is fixed to the upper surface of the turntable 41. The upper surface of the disk support member 35 serves as a support surface on which the disk 90 is placed. In the present preferred embodiment, the turntable 41 indirectly supports the lower surface of the disk 90 through the disk support member 35. Alternatively, the turntable 41 may directly support the lower surface of the disk 90 with no intervention of the disk support member 35.

The disk guide portion 42 is arranged above the upper cover portion 32*b* and radially inwards of the turntable 41. The disk guide portion 42 preferably includes a contact surface 42*a* that can make contact with the inner circumferential portion of the disk 90. The contact surface 42*a* decides the radial position of the disk 90 by making contact with the inner circumferential portion of the disk 90 placed on the disk support member 35.

A reception portion 42*b* is formed in the disk guide portion 42. The clamp magnet 36 and the yoke 37 are received within the reception portion 42*b*. The clamp magnet 36 is a permanent magnet. The clamp magnet 36 generates a magnetic attraction force between itself and the clamper 14. The yoke 37 is a magnetic body made of, e.g., a metal. The yoke 37 serves to enhance the directivity of magnetic fields generated from the clamp magnet 36. The disk 90 is bolded between the disk support member 35 and the clamper 14 by the magnetic attraction force acting between the clamp magnet 36 and the clamper 14.

The clamp magnet 36 may be arranged in one of the brushless motor 13 and the clamper 14. In case where the clamp magnet 36 is arranged in the clamper 14, only the yoke 37 may be arranged within the reception portion 42*b* of the brushless motor 13.

The rolling guide portion 43 is arranged below the upper cover portion 32*b* and radially inwards of the cylinder portion 32*c*. As shown in FIGS. 4 and 5, the rolling guide portion 43 preferably includes a top panel portion 43*a*, an outer wall portion 43*b* and an inner wall portion 43*c*. The top panel portion 43*a* is an annular portion contiguous to the lower surface of the upper cover portion 32*b*. The outer wall portion 43*b* is a cylindrical portion extending downwards from the radial outer edge of the top panel portion 43*a*. The outer wall portion 43*b* is contiguous to the inner circumferential surface of the cylinder portion 32*c*. The inner wall portion 43*c* is a cylindrical portion extending downwards from the radial inner edge of the top panel portion 43*a*. The junction area between the top panel portion 43a and the inner wall portion 43c is formed into a slant surface inclined with respect to the axial direction or a curved surface. Similarly, the junction area between the top panel portion 43a and the outer wall portion 43b is formed into a slant surface inclined with respect to the axial direction or a curved surface.

The rolling guide portion 43 is formed into a downwardly-opened annular groove shape. The rolling guide portion 43 is composed of the top panel portion 43a, the outer wall portion 43b and the inner wall portion 43c. A closing member 38 is attached to the lower end of the rolling guide portion 43. The closing member 38 closes up the rolling guide portion 43 of annular groove shape from below. The closing member 38 is made of a metal, e.g., a zinc-coated steel plate or a tin-coated steel plate. The closing member 38 is fixed to the rolling guide portion 43 by press-fit or welding. However, the material and fixing method of the closing member 38 is not limited the examples noted above.

A plurality of balls 39 is arranged in the annular space surrounded by the rolling guide portion 43 and the closing member 38. In the space, the balls 39 thus arranged can make rolling movement along the circumferential direction. The balls 39 are placed on an antiskid member (seat) 38a attached to the upper surface of the closing member 38. The balls 39 serve to correct the positional deviation of the gravity center of the rotary unit 3 and the disk 90 as a whole with respect to the center axis 9. If the rotary unit 3 and the disk 90 rotate at a specified revolution number or more, the balls 39 make rolling movement in the opposite direction from the gravity center with respect to the center axis 9. Thus, the position of the gravity center of the rotary unit 3 and the disk 90 as a whole is adjusted to come closer to the center axis 9.

As set forth earlier, the rolling guide portion 43 is arranged below the upper cover portion 32b of the rotor holder 32 and radially inwards of the cylinder portion 32c. Therefore, the noises generated by the rolling movement of the balls 39 are restrained from propagating to the outside, as compared with the case where the rolling guide portion 43 would be arranged above the upper cover portion 32b.

The turntable 41 and the rolling guide portion 43 make up portions of the single resin member 34. The turntable 41 and the rolling guide portion 43 extend continuously through the through-holes 32d of the rotor holder 32. Thus, the turntable 41 and the rolling guide portion 43 are fixed to the rotor holder 32.

In the present preferred embodiment, the through-holes 32d are arranged below the turntable 41 and above the rolling guide portion 43. In other words, the through-holes 32d are arranged in such positions where the turntable 41 and the rolling guide portion 43 overlap with each other when seen in a plan view. Thus, the turntable 41 and the rolling guide portion 43 are joined to each other without making a detour. As a result, the turntable 41 and the rolling guide portion 43 are fixed to the rotor holder 32 in a stronger manner.

The inner annular portion 44 is arranged beneath the upper cover portion 32b and radially inwards of the rolling guide portion 43. The upper surface of the inner annular portion 44 is contiguous to the lower surface of the upper cover portion 32b. Due to the provision of the inner annular portion 44, the resin member 34 is even strongly fixed to the rotor holder 32. During an insert-molding process, the inner annular portion 44 is interposed between the lower surface of the upper cover portion 32b and the mold 61 (see FIG. 7). This eliminates the possibility that the upper cover portion 32b makes direct contact with the mold 61. Therefore, even if the upper cover portion 32b and the mold 61 have dimensional errors, it is possible to restrain the dimensional errors from affecting the dimensions of the insert-molded product. A curved surface or a slant surface is formed in the junction area between the inner annular portion 44 and the inner wall portion 43c. Similarly, a curved surface or a slant surface is formed in the junction area between the downwardly-extending wall portion, which is contiguous to the fastening portion 32a, and the inner annular portion 44.

The covering portion 45 is a cylindrical portion extending downwards from the turntable 41. The outer circumferential surface of the cylinder portion 32c of the rotor holder 32 is covered with the covering portion 45. In the insert-molding process, the covering portion 45 is interposed between the outer circumferential surface of the cylinder portion 32c of the rotor holder 32 and the mold 61. Thus, the rotor holder 32 is restrained from scraping the mold 61 when the rotor holder 32 and the resin member 34 are removed from the mold 61. This helps suppress damage of the mold 61 which may be caused in the insert-molding process. The covering portion 45 covers the outer surface of the end portion 32c1 of the cylinder portion 32c.

The preload magnet 40 is an annular permanent magnet. The preload magnet 40 is fixed to the lower surface of the closing member 38. An axially-acting magnetic attraction force is generated between the preload magnet 40 and the sleeve housing 22b. The rotary unit 3 is attracted toward the stationary unit 2 by the magnetic attracting force, thereby stabilizing the rotation posture of the rotary unit 3.

If a drive current is applied to the coils 25 of the stationary unit 2 of the brushless motor 13, magnetic flux is generated in the tooth portions 24a of the stator core 24. Circumferentially-acting torque is generated under the action of the magnetic flux flowing between the tooth portions 24a and the rotor magnet 33. This torque causes the rotary unit 3 to rotate about the center axis 9 with respect to the stationary unit 2. The disk 90 held in the rotary unit 3 is rotated about the center axis 9 together with the rotary unit 3.

<2-3. Steps of Insert-Molding>

Figure 6:
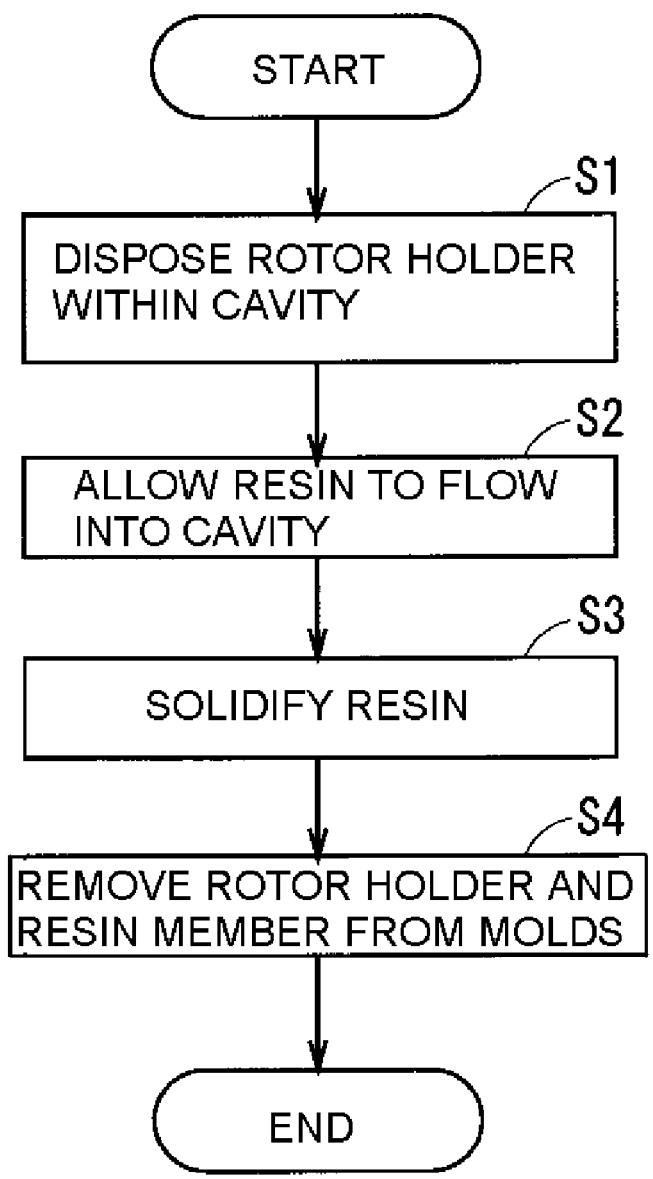
FIG. 6 is a flowchart illustrating insert-molding steps.
Figure 7:
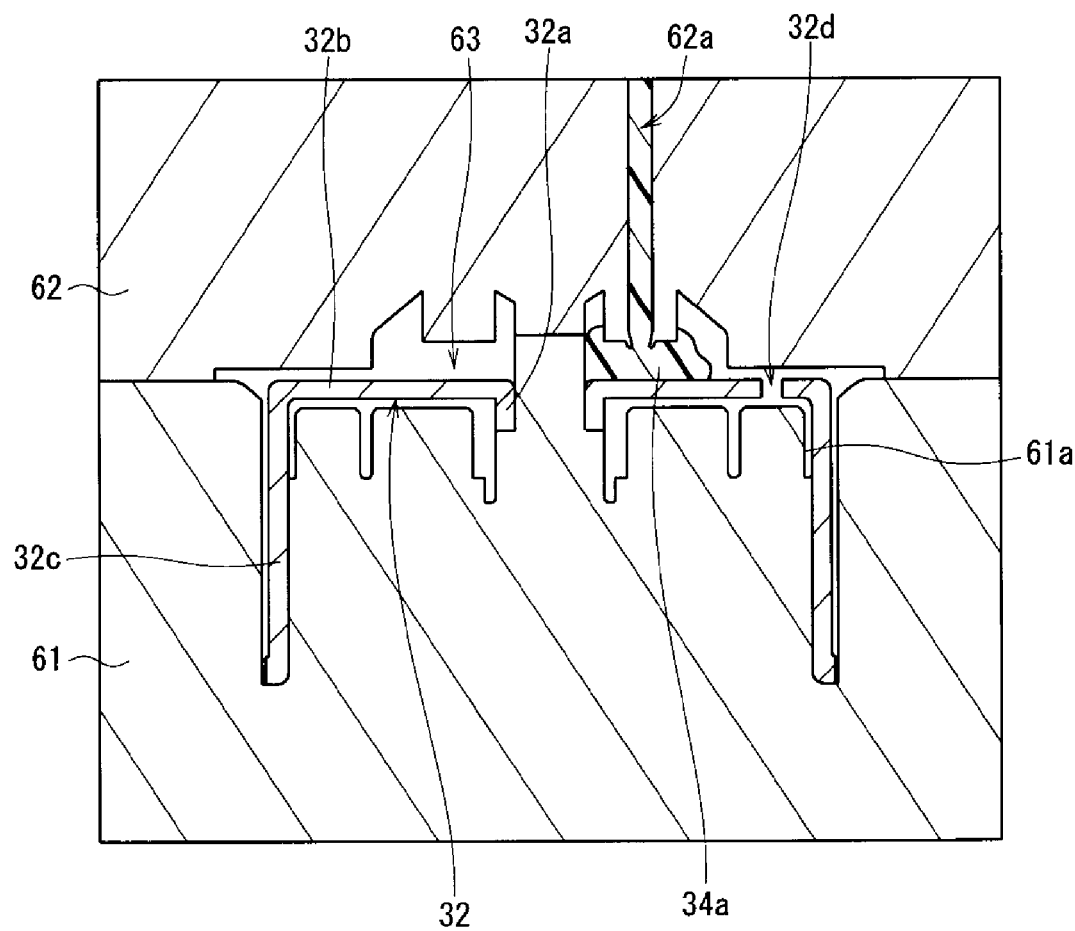
FIG. 7 is a vertical section view showing an insert-molding state.

Next, description will be made on the steps of unifying the rotor holder 32 and the resin member 34 through insert-molding in the manufacturing process of the chucking device 4. FIG. 6 is a flowchart illustrating the insert-molding steps. FIG. 7 is a vertical section view showing an insert-molding state.

A pair of molds 61 and 62 and a preliminarily manufactured rotor holder 32 are prepared in order to perform the insert-molding. The rotor holder 32 is produced by, e.g., press-forming. Alternatively, the rotor holder 32 may be produced by cutting. Through-holes 32d are defined in the upper cover portion 32b of the rotor holder 32. A cavity 63 is defined inside the molds 61 and 62 by bringing the opposing surfaces of the molds 61 and 62 into contact with each other. The cavity 63 has a shape corresponding to the unified shape of the rotor holder 32 and the resin member 34.

First, the rotor holder 32 is set within the mold 61. At this time, the position of the rotor holder 32 relative to the mold 61 may be determined using a release pin (not shown). Alternatively, the position of the rotor holder 32 relative to the mold 61 may be determined by bringing the mold 61 or the release pin into contact with the end portion 32c1 of the cylinder portion 32c. It is preferred that, when fixing the rotor holder 32 in place, the mold 61 make contact with the upper cover portion 32b. Subsequently, the opposing surfaces of the molds 61 and 62 are brought into contact with each other to define the cavity 63 inside the molds 61 and 62. Thus, the rotor holder 32 is disposed within the cavity 63 (step S1). Next, a liquid resin 34a is injected into the cavity 63 (step S2). As shown in FIG. 7, the liquid resin 34a is allowed to flow into the cavity 63 through a gate 62a formed in at least the mold 62. At this time, a resin injection pressure is applied to the rotor holder 32. Nevertheless, the positional deviation of the rotor holder 32 within the cavity 63 is suppressed because the position of the rotor holder 32 relative to the molds 61 and 62 is determined as above and because the mold 61 makes contact with the upper cover portion 32b.

Once the liquid resin 34a is uniformly spread within the cavity 63, the liquid resin 34a in the cavity 63 is cooled and solidified (step S3). As the solidification proceeds, the liquid resin 34a in the cavity 63 is formed into a resin member 34. Eventually, the rotor holder 32 and the resin member 34 are unified together. Thereafter, the molds 61 and 62 are opened, and the rotor holder 32 and the resin member 34 unified together are removed from the molds 61 and 62 by use of a release pin or the like (step S4).

The resin member 34 is molded in such a shape as to include a turntable 41, a disk guide portion 42, a rolling guide portion 43, an inner annular portion 44 and a covering portion 45. The turntable 41 and the rolling guide portion 43 extend continuously through the through-holes 32d of the rotor holder 32 and make up portions of the resin member 34. As a consequence, the turntable 41 and the rolling guide portion 43 are fixed to the rotor holder 32 in a stronger manner.

The rolling guide portion 43 is formed below the upper cover portion 32b of the rotor holder 32 and radially inwards of the cylinder portion 32c of the rotor holder 32. In the chucking device 4 thus produced, therefore, the noises generated by the rolling movement of the balls 39 are restrained from propagating to the outside.

Assuming that the rotor holder 32 and the rolling guide portion 43 are fixed to each other by press-fit, the rolling guide portion 43 may possibly be deformed due to the press-fit stresses, which may impair the concentricity and circularity of the rolling guide portion 43 with respect to the center axis 9. Supposing that the rotor holder 32 and the rolling guide portion 43 are fixed to each other by use of an adhesive agent, the concentricity of the rolling guide portion 43 with respect to the center axis 9 may possibly be impaired unless the adhesive agent is uniformly distributed in the circumferential direction. In addition, if the rotor holder 32 and the rolling guide portion 43 are fixed to each other by press-fit or by use of an adhesive agent, it is likely that the rolling guide portion 43 may be fixed to the rotor holder 32 in an inclined state.

In the present preferred embodiment, the metal-made rotor holder 32 and the resin-made rolling guide portion 43 are unified together by insert-molding. The surfaces of the rolling guide portion 43 are molded by the mold 61. The position of the rotor holder 32 is determined by the mold 61. This means that the deviation in the radial relative positions of the rolling guide portion 43 and the rotor holder 32 can be suppressed by using a mold 61 finished with a higher degree of precision. In other words, it becomes possible to arrange the rolling guide portion 43 and the rotor holder 32 with increased concentricity. Moreover, the axial position of the rolling guide portion 43 is accurately set over the full circumference thereof. This helps restrain the rolling guide portion 43 from being inclined with respect to the rotor holder 32.

Preferably, the mold 61 includes a mirror-finished surface 61a arranged to mold at least the inner circumferential surface of the outer wall portion 43b. This ensures that the inner circumferential surface of the outer wall portion 43b is molded with increased accuracy. With the rolling guide portion 43 thus molded, the balls 39 can make rolling movement in a smoother manner, consequently reducing the noises generated by the rolling movement of the balls 39.

In this regard, the term "mirror-finished" means that a subject surface is finished so that the maximum height Rz prescribed in JIS B0601:2001 (corresponding to ISO 4287: 1997) can be equal to or smaller than 0.6 μm. A stylus-type surface roughness measuring instrument prescribed in JIS B0651:2001 (corresponding to ISO 3274:1996) may be used in measuring the maximum height Rz.

3. First Example of Application to Other Types of Motors

Next, description will be made on another type of brushless motor applied with the present invention. The following description will be focused on the points differing from the brushless motor 13 of the foregoing preferred embodiment. The same components as those of the brushless motor 13 will be omitted from description.

Figure 8:
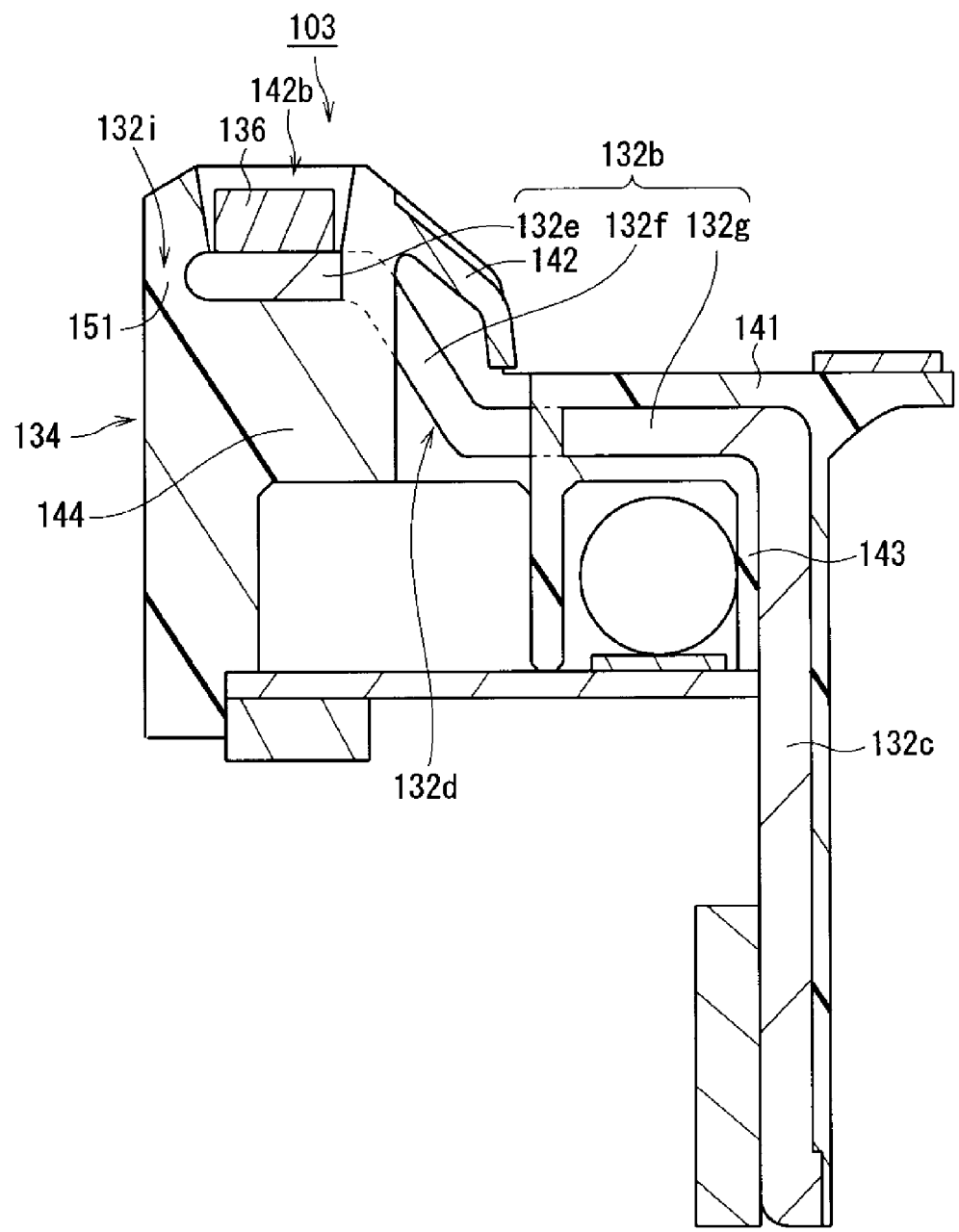
FIG. 8 is a partial vertical section view showing a rotary unit of another type of brushless motor.

FIG. 8 is a partial vertical section view showing a rotary unit 103 of another type of brushless motor. In the example shown in FIG. 8, the resin member 134 preferably includes centering claws 142 arranged to make contact with the inner circumferential portion of the disk 90. The centering claws 142 are arranged radially inwards of the rolling guide portion 143 and axially above the upper surface of the turntable 141. The centering claws 142 serve to determine the radial position of the disk 90 by making contact with the inner circumferential portion of the disk 90.

In the example shown in FIG. 8, the upper cover portion 132b of the rotor holder 132 preferably includes an inner flat portion 132e, an outwardly downwardly inclined portion 132f and an outer flat portion 132g. The inner flat portion 132e is a portion extending radially inwards from the radial inner end of the outwardly downwardly inclined portion 132f. The outwardly downwardly inclined portion 132f is a portion extending radially outwards and downwards from the radial outer edge of the inner flat portion 132e. The lower surface of the outwardly downwardly inclined portion 132f is contiguous to the upper surface of the inner annular portion 144. The outer flat portion 132g is a portion extending radially between the outwardly downwardly inclined portion 132f and the cylinder portion 132c.

In the example shown in FIG. 8, the upper cover portion 132b of rotor holder 132 is raised upwards in the central area thereof. Thus, the resin member 134 has a reduced thickness in the area around the centering claws 142. This helps suppress generation of depressions in the resin member 134 around the centering claws 142, which would otherwise occur due to the shrinkage of a resin during the molding process.

In the example shown in FIG. 8, a reception portion 142b is formed in the upper surface area of the resin member 134 existing radially inwards of the centering claws 142. A clamp magnet 136 is received in the reception portion 142b. The inner flat portion 132e of the rotor holder 132 is exposed into the reception portion 142b. The clamp magnet 136 is arranged on the upper surface of the inner flat portion 132e. This makes it possible to use the inner flat portion 132e as a yoke for the clamp magnet 136.

In the example shown in FIG. 8, the rotor holder 132 preferably includes a plurality of under-claw through-holes 132d and a central opening 132i. The under-claw through-holes 132d are arranged below the centering claws 142. The lower surfaces of the centering claws 142 are kept out of contact with the upper surface of the upper cover portion 132b. During the insert-molding process, a mold is inserted into the under-claw through-holes 132d from below. The lower surfaces of the centering claws 142 are molded by the mold. The turntable 141 and the rolling guide portion 143 extend continuously through the under-claw through-holes 132d. In the example shown in FIG. 8, therefore, the under-claw through-holes 132d can be used for the common purposes of joining the turntable 141 and the rolling guide portion 143 together and molding the lower surface of the centering claws 142.

The central opening 132i is defined in the central area of the upper cover portion 132b of the rotor holder 132. The central opening 132i has a diameter greater than that of the shaft 131. In the example shown in FIG. 8, therefore, the inner circumferential portion of the rotor holder 132 does not make direct contact with the outer circumferential surface of the shaft 131. The resin member 134 extends continuously in the vertical direction through a interconnection portion 151 formed inside the central opening 132i. The interconnection portion 151 is fixed to the outer circumferential surface of the shaft 131.

In the motor of the type including the centering claws 142 as shown in FIG. 8, the rotor holder 132 may be directly fixed to the shaft 131. The fixing strength obtained by fixing the rotor holder 132 to the shaft 131 is greater than the fixing strength available when the resin member 134 is fixed to the shaft 131.

4. Second Example of Application to Other Types of Motors

Figure 9:
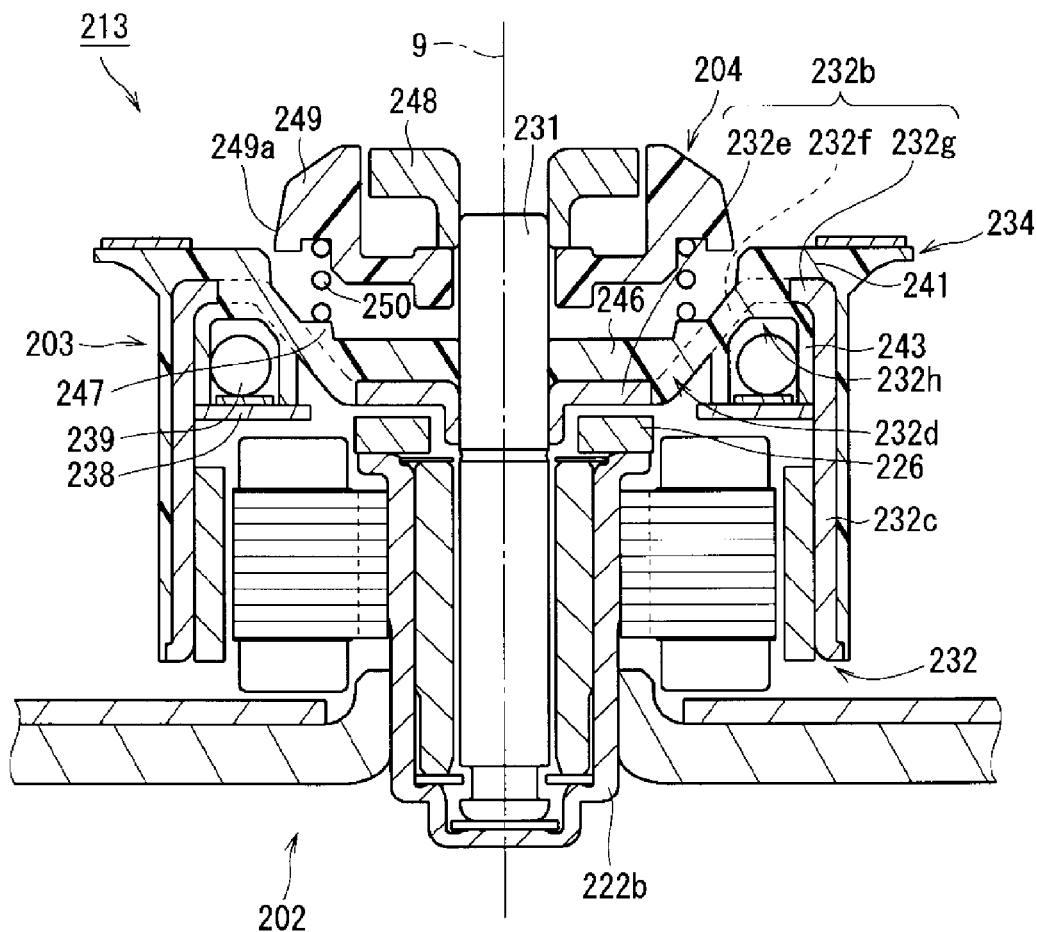
FIG. 9 is a vertical section view showing a further type of brushless motor.
Figure 10:
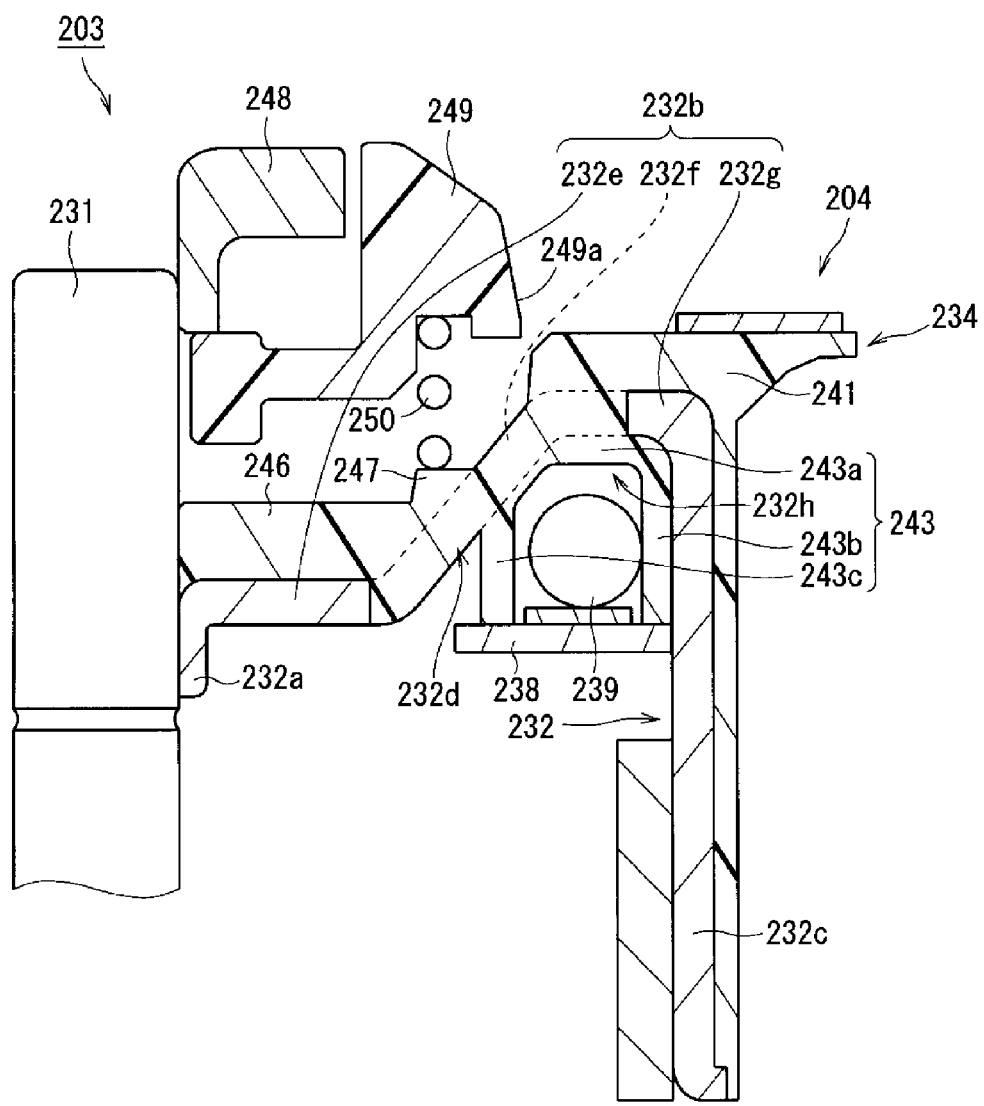
FIG. 10 is a partial vertical section view showing a rotary unit of the brushless motor shown in FIG. 9.
Figure 11:
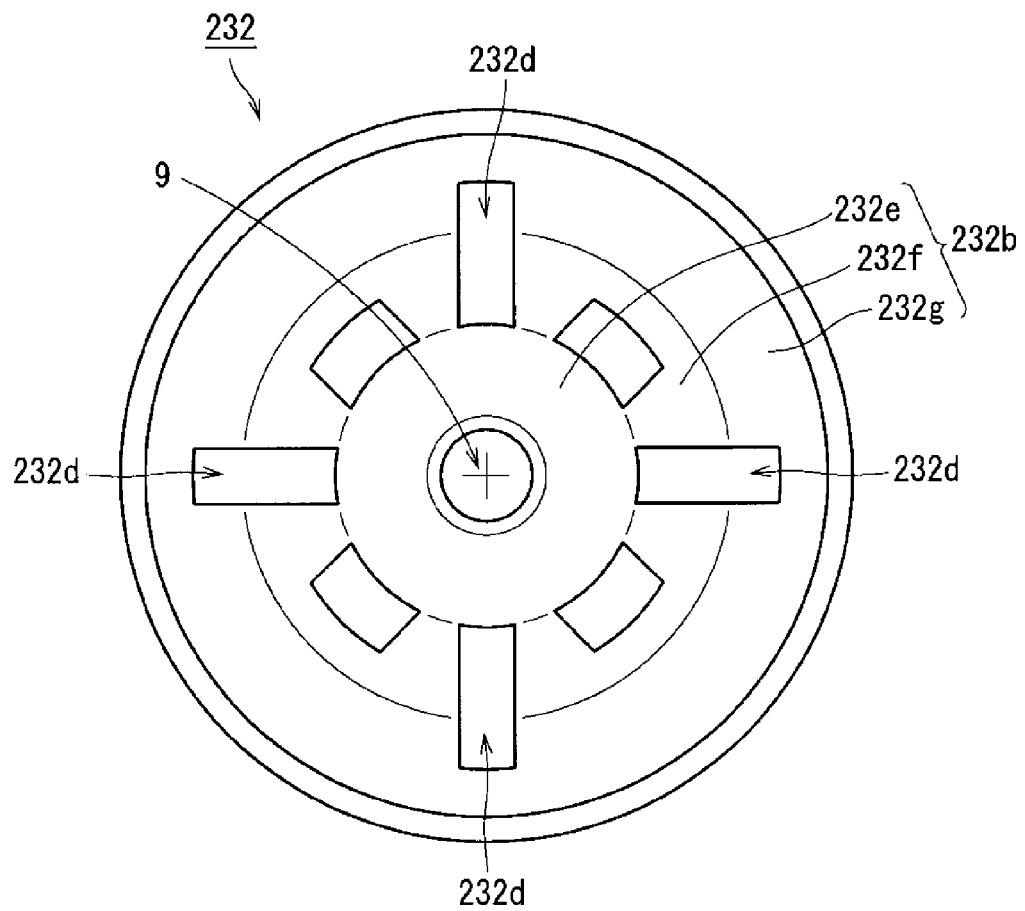
FIG. 11 is a top view showing a rotor holder of the rotary unit shown in FIG. 10.

Next, description will be made on a further type of brushless motor 213 applied with the present invention. FIG. 9 is a vertical section view showing a further type of brushless motor 213. FIG. 10 is a partial vertical section view showing the rotary unit 203 of the brushless motor 213. FIG. 11 is a top view showing the rotor holder 232 of the brushless motor 213. The following description will be centered on the points differing from the brushless motor 13 of the foregoing preferred embodiment.

In the example shown in FIGS. 9 through 11, the upper cover portion 232b of the rotor holder 232 preferably includes an inner flat portion 232e, an inwardly downwardly inclined portion 232f and an outer flat portion 232g. The inner flat portion 232e is a portion extending radially between the fastening portion 232a and the inwardly downwardly inclined portion 232f. The inwardly downwardly inclined portion 232f is a portion extending radially outwards and upwards from the radial outer edge of the inner flat portion 232e. The outer flat portion 232g is a portion extending radially between the inwardly downwardly inclined portion 232f and the cylinder portion 232c.

The upper cover portion 232b of the rotor holder 232 preferably includes a plurality of through-holes 232d arranged at an equal interval in the circumferential direction. The through-holes 232d are axially pierced through the upper cover portion 232b to extend across the inwardly downwardly inclined portion 232f and the outer flat portion 232g. In this example, the through-holes 232d are arranged at an equal interval in the circumferential direction. This helps reduce the deviation in the gravity center of the rotor holder 232. However, the through-holes 232d may not always be arranged at an equal interval in the circumferential direction. Alternatively, the through-holes 232d may be arranged at irregular intervals.

On the lower surface of the upper cover portion 232b, a downwardly-opened annular recess portion 232h is defined by the inwardly downwardly inclined portion 232f, the outer flat portion 232g and the cylinder portion 232c. A rolling guide portion 243 is arranged within the annular recess portion 232h. The rolling guide portion 243 makes up a portion of the resin member 234 unified with the rotor holder 232 by insert-molding.

The rolling guide portion 243 preferably includes a top panel portion 243a, an outer wall portion 243b and an inner wall portion 243c. The top panel portion 243a is contiguous to the lower surface of the outer flat portion 232g. The outer wall portion 243b extends downwards from the radial outer end of the top panel portion 243a. The inner wall portion 243c extends downwards from the radial inner edge of the top panel portion 243a. A slant surface extending along the inwardly downwardly inclined portion 232f is formed in the junction area between the top panel portion 243a and the inner wall portion 243c. The junction area between the top panel portion 243a and the outer wall portion 243b is formed into a curved surface or a slant surface. A closing member 238 arranged to close the rolling guide portion 243 from below is attached to the lower end of the rolling guide portion 243. An annular space is defined by the rolling guide portion 243 and the closing member 238. A plurality of balls 239 is arranged within the annular space to make rolling movement in the circumferential direction.

The inner wall portion 243c of the rolling guide portion 243 is arranged below the inwardly downwardly inclined portion 232f. Therefore, if the through-holes 232d are absent, it would be difficult to secure a space through which a liquid resin can flow between the top panel portion 243a and the inner wall portion 243c.

Figure 12:
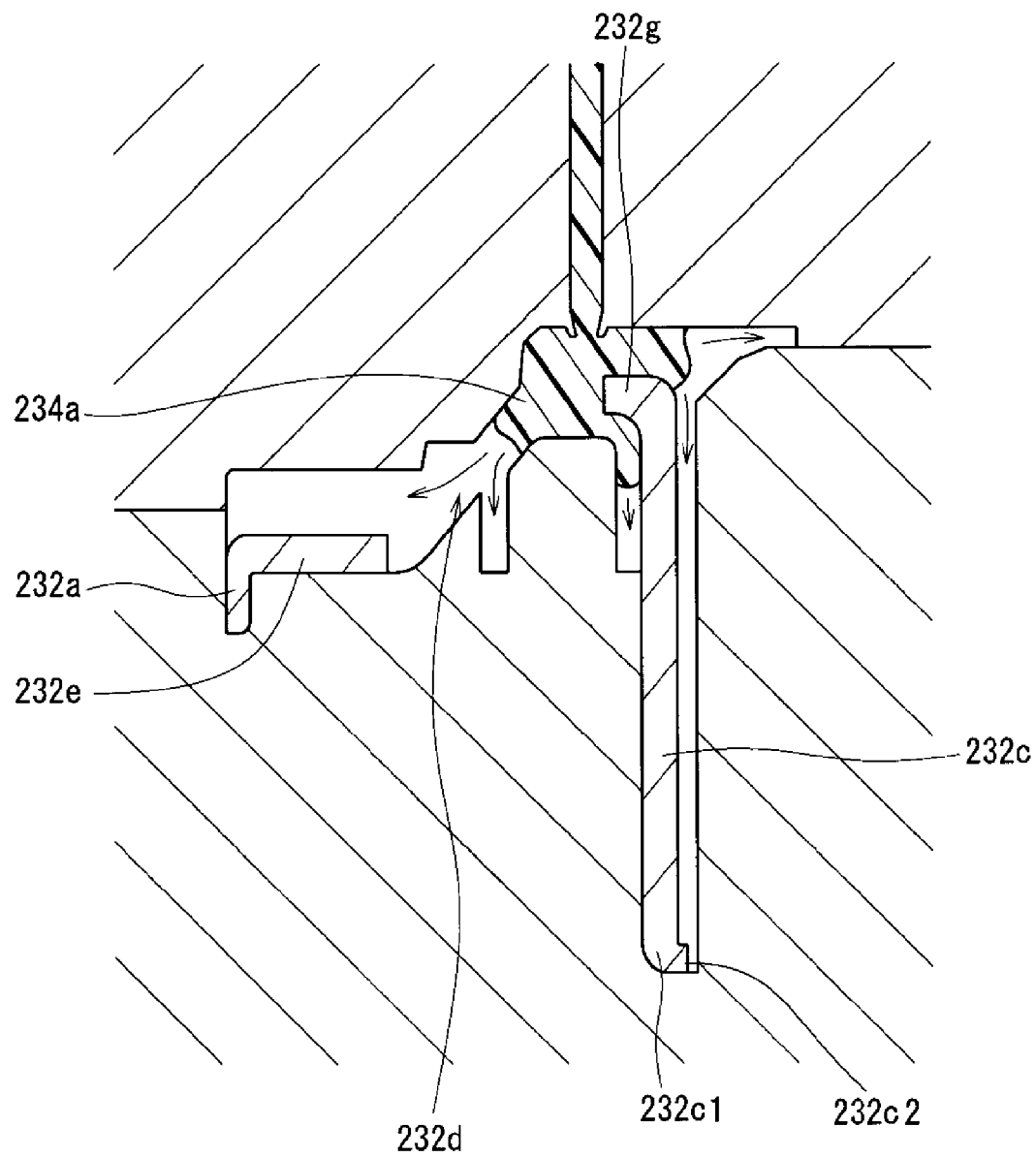
FIG. 12 is a vertical section view showing an insert-molding state.

In the example shown in FIGS. 9 through 11, the through-holes 232d are defined to extend across the inwardly downwardly inclined portion 232f and the outer flat portion 232g. The through-holes 232d are positioned above the inner wall portion 243c. In other words, the through-holes 232d are arranged in an overlapping relationship with the inner wall portion 243c when seen in a plan view. Therefore, as shown in FIG. 12, a liquid resin can flow between the top panel portion 243a and the inner wall portion 243c through the through-holes 232d during the insert-molding process. This enables the resin to uniformly spread into the top panel portion 243a and the inner wall portion 243c. Consequently, the top panel portion 243a and the inner wall portion 243c are strongly connected to each other.

A central resin portion 246 and a spring rest portion 247 are formed axially above the inner flat portion 232e and radially inwards of the inwardly downwardly inclined portion 232f. The central resin portion 246 and the spring rest portion 247 are joined to the turntable 241 and the rolling guide portion 243 through the through-holes 232d.

During the insert-molding process, the central resin portion 246 and the spring rest portion 247 are molded to make up portions of the resin member 234. Therefore, the central resin portion 246 and the spring rest portion 247 are strongly fixed to the remaining portions of the resin member 234 and the rotor holder 232. In the example shown in FIGS. 9 through 11, the through-holes 232d are arranged radially outwards of the central resin portion 246 and the spring rest portion 247 at the substantially same vertical position as the central resin portion 246 and the spring rest portion 247. In the insert-molding process, therefore, a liquid resin can easily flow into the places of the cavity where the central resin portion 246 and the spring rest portion 247 are to be formed. Accordingly, it is possible to form the central resin portion 246 and the spring rest portion 247 with increased accuracy.

The vertical position of the upper surfaces of the central resin portion 246 and the spring rest portion 247 can be finely adjusted with ease by virtue of the molds used in the insert-molding.

A yoke 248, a centering member 249 and a pre-compression spring 250 are arranged above the central resin portion 246 and the spring rest portion 247. The yoke 248 is fixed to the shaft 231. The yoke 248 serves to generate a magnetic attraction force between itself and the clamper 14 (see FIG. 2). The centering member 249 is vertically movable along the shaft 231. The centering member 249 preferably includes a support surface 249a arranged to support the inner circumferential portion of the disk 90.

The pre-compression spring 250 is interposed between the centering member 249 and the spring rest portion 247. The upper end portion of the pre-compression spring 250 remains in contact with the lower surface of the centering member 249. The lower end portion of the pre-compression spring 250 is kept in contact with the upper surface of the spring rest portion 247. The pre-compression spring 250 biases the centering member 249 upwards. When the disk 90 is not held in position, the centering member 249 makes contact with the lower surface of the yoke 248 and remains stationary in that state. In contrast, when holding the disk 90 in position, the centering member 249 moves downwards against the biasing force of the pre-compression spring 250 while supporting the inner circumferential portion of the disk 90. The support surface 249a of the centering member 249 determines the radial position of the disk 90 by making contact with the inner circumferential portion of the disk 90.

If the centering member 249 moves further downwards with the disk 90 held in position, it makes contact with the upper surface of the central resin portion 246. This limits the downwardly movable position of the centering member 249. Alternatively, the central resin portion 246 may be omitted so that the centering member 249 can make contact with the upper surface of the rotor holder 232.

In the example shown in FIGS. 9 through 11, the central resin portion 246, the spring rest portion 247, the centering member 249 and the pre-compression spring 250 are arranged radially inwards of the inwardly downwardly inclined portion 232f. The rolling guide portion 243 is arranged radially outwards of the inwardly downwardly inclined portion 232f. In other words, the space for accommodation of the central resin portion 246, the spring rest portion 247, the centering member 249 and the pre-compression spring 250 and the space for accommodation of the rolling guide portion 243 are arranged along the radial direction and partitioned by the inwardly downwardly inclined portion 232f. Since the spaces are not arranged along the axial direction, it is possible to reduce the axial dimension of the chucking device 204.

In the brushless motor 213 shown in FIG. 9, the preload magnet 226 is fixed to the upper end portion of the sleeve housing 222b of the stationary unit 202. The inner flat portion 232e of the upper cover portion 232b of the rotor holder 232 is depressed downwards from the outer flat portion 232g. Thus, the inner flat portion 232e comes close to the upper surface of the preload magnet 226. This makes it possible to generate a magnetic attraction force between the inner flat portion 232e of the rotor holder 232 and the preload magnet 226.

Alternatively, the preload magnet 226 may be fixed to the lower surface of the inner flat portion 232e of the rotor holder 232. In this case, a magnetic attraction force is generated between the preload magnet 226 and the sleeve housing 222b of the stationary unit 202. The inner flat portion 232e of the rotor holder 232 is used as a yoke for the preload magnet 226.

In case where the preload magnet 226 is fixed to the lower surface of the inner flat portion 232e, the position of the preload magnet 226 may be determined by bringing the preload magnet 226 into contact with the fastening portion 232a of the rotor holder 232. The preload magnet 226 is fixed to the inner flat portion 232e by an adhesive agent or other fixing methods.

In the example shown in FIGS. 9 through 12, the cylinder portion 232c including the end portion 232c1 is covered with a resin. The end portion 232c1 is provided with a protrusion portion 232c2 protruding radially outwards beyond the outer surface of the cylinder portion 232c. The protrusion portion 232c2 is formed by severing the rotor holder 232 from a plate-shaped member when the latter is subjected to press-forming.

As shown in FIG. 12, the thickness of the resin covering the outer surface of the cylinder portion 232c is set smaller than the thickness of the cylinder portion 232c. Alternatively, the resin covering the protrusion portion 232c2 may cover not only the radial outer surface of the protrusion portion 232c2 but also the axial lower surface thereof.

As set forth above, the rotor holder 232 and the resin member 234 are unified together by insert-molding. In the insert-molding process, a resin injection pressure is applied to the rotor holder 232 as a molten resin is injected into the cavity. For this reason, the rotor holder 232 needs to be stably positioned within the molds so that the rotor holder 232 should not be displaced from a specified position within the molds under the injection pressure.

In the example shown in FIG. 12, one of the molds partially makes contact with the protrusion portion 232c2 and the inner flat portion 232e. The mold may come into contact with the protrusion portion 232c2 and the inner flat portion 232e either along the full circumference or at a number of points equally spaced-apart in the circumferential direction. In the illustrated example, the mold abuts against the protrusion portion 232c2 and the inner flat portion 232e from the axial lower side in FIG. 12.

Although not shown in the drawings, a plurality of release pins may be allowed to axially abut against the protrusion portion 232c2 and the inner flat portion 232e. In the example shown in FIG. 12, the release pins are arranged along the protrusion portion 232c2 and the inner flat portion 232e at an equal interval in the circumferential direction. This makes it possible to determine the position of the rotor holder 232 with respect to the mold.

Use of the mold and the release pins prevents the rotor holder 232 from being displaced from a specified position on the mold even when a molten resin is injected toward the rotor holder 232 from a gate. This makes it possible to produce a resin-molded product with increased accuracy.

The release pins are also used in removing the rotor holder 232 and the resin member 234 unified together from the mold.

The position of the gate and the positions of the mold and the release pins are not limited to the ones described above but may be appropriately changed.

5. Fixing Structure of Closing Member

In the afore-mentioned preferred embodiment of the subject application, the rolling guide portion is arranged below the upper cover portion of the rotor holder and opened downwards. The closing member is attached to the lower end of the rolling guide portion. In other words, the afore-mentioned preferred embodiments provide a structure in which the closing member is not gripped between the rolling guide portion and other portions. In case of this structure, it is preferred that the closing member be strongly fixed to the rolling guide portion to avoid removal of the closing member. Taking the manufacturing work efficiency into account, it is preferred that the closing member be fixed to the rolling guide portion without having to determine the circumferential position thereof. Description will now be made on the fixing structures of the closing member that can comply with the requirements noted above.

Figure 13:
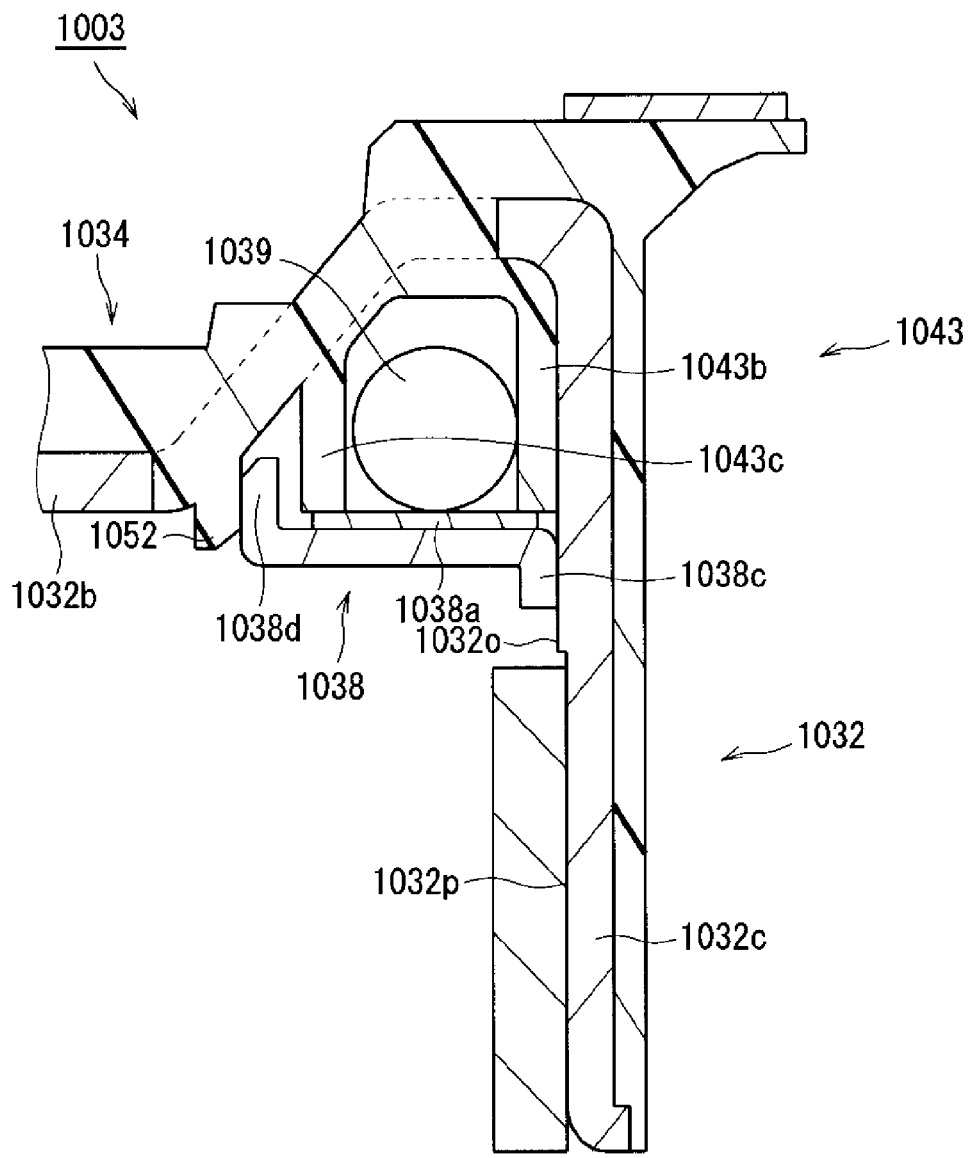
FIG. 13 is a partial vertical section view showing an example of the rotary unit.

FIG. 13 is a partial vertical section view showing a rotary unit 1003 including a rolling guide portion 1043 and a closing member 1038. In the example shown in FIG. 13, an outer protrusion portion 1038c protruding downwards is formed in the outer circumferential portion of the closing member 1038. The closing member 1038 is press-fitted to the rotor holder 1032 with the outer circumferential surface of the outer protrusion portion 1038c kept in contact with the inner circumferential surface of the cylinder portion 1032c. This makes it possible to fix the closing member 1038 to the rotor holder 1032 and the rolling guide portion 1043 without having to determine the circumferential position thereof.

In the example shown in FIG. 13, the closing member 1038 is provided with the outer protrusion portion 1038c. Thus, the contact area between the rotor holder 1032 and the closing member 1038 is axially broader than when the outer protrusion portion 1038c is absent. Accordingly, the press-fitting strength of the rotor holder 1032 and the closing member 1038 is greater than when the outer protrusion portion 1038c is absent.

On the other hand, an inner protrusion portion 1038d protruding upwards is formed in the inner circumferential portion of the closing member 1038. The inner protrusion portion 1038d preferably includes a slant surface or a curved surface formed in the tip end portion thereof. Moreover, the resin member 1034 shown in FIG. 13 preferably includes a jut portion 1052. The jut portion 1052 is positioned radially inwards of the rolling guide portion 1043 and below the upper cover portion 1032b of the rotor holder 1032. The jut portion 1052 extends downwards in this position. The jut portion 1052 preferably includes a slant surface or a curved surface formed in the tip end portion thereof. A gap is defined radially between the jut portion 1052 and the inner wall portion 1043c. At the upper side of the gap, a slant surface portion is formed in the resin member 1034 or the upper cover portion 1032b. The closing member 1038 is press-fitted to the rotor holder 1032 and the resin member 1034 with the inner circumferential surface of the inner protrusion portion 1038d kept in contact with the outer circumferential surface of the jut portion 1052. In other words, the inner protrusion portion 1038d is inserted between the jut portion 1052 and the inner wall portion 1043c. The jut portion 1052 can be press-fitted with ease because a slant surface or a curved surface is formed at the tip end portion of the jut portion 1052. In the example shown in FIG. 13, a gap is defined radially between the inner protrusion portion 1038d and the inner wall portion 1043c. Alternatively, the inner protrusion portion 1038d may make contact with the inner wall portion 1043c.

In the example shown in FIG. 13, the outer and inner circumferential surfaces of the closing member 1038 are brought into contact with the rotor holder 1032 and the resin member 1034, respectively. As a consequence, the closing member 1038 is fixed to the rotor holder 1032 and the resin member 1034 in a stronger manner.

In the example shown in FIG. 13, the closing member 1038 is provided with the inner protrusion portion 1038d. Thus, the contact area between the jut portion 1052 and the closing member 1038 is axially broader than when the inner protrusion portion 1038d is absent. Accordingly, the press-fitting strength of the resin member 1034 and the closing member 1038 is greater than when the inner protrusion portion 1038d is absent.

The inner circumferential surface of the cylinder portion 1032c of the rotor holder 1032 preferably includes a first inner circumferential surface 1032o and a second inner circumferential surface 1032p positioned below the first inner circumferential surface 1032o, the second inner circumferential surface 1032p being greater in diameter than the first inner circumferential surface 1032o. In the example shown in FIG. 13, the first and second inner circumferential surfaces 1032o and 1032p vertically adjoin to each other with a step difference left therebetween. Alternatively, the first and second inner circumferential surfaces 1032o and 1032p may be jointed to each other through a tapering surface or a gently curved surface.

When the closing member 1038 is attached to the rotor holder 1032, the closing member 1038 is inserted inside the cylinder portion 1032c from the lower side of the rotor holder 1032. At this time, the closing member 1038 is inserted with a playing space left inside the second inner circumferential surface 1032p. Thus, the closing member 1038 can be easily inserted up to the upper end of the second inner circumferential surface 1032p. Thereafter, the outer protrusion portion 1038c of the closing member 1038 is brought into contact with the first inner circumferential surface 1032o. Then, the closing member 1038 is press-fitted inside the first inner circumferential surface 1032o. By providing the first and second inner circumferential surfaces 1032o and 1032p in this manner, it becomes possible to shorten the axial press-fitting distance of the closing member 1038. Accordingly, the closing member 1038 can be press-fitted to the rotor holder 1032 with ease.

A sheet 1038a is arranged on the upper surface of the closing member 1038. A plurality of balls 1039 makes rolling movement along the upper surface of the sheet 1038a. As the material of the sheet 1038a, it is possible to use, e.g., urethane rubber, chloroprene rubber or ethylene propylene rubber. In place of these substances, silicon rubber, butyl rubber, styrene butadiene rubber or resin-plastic elastomer may be used as the material of the sheet 1038a.

The sheet 1038a is capable of reducing the noises generated by the rolling movement of the balls 1039. Furthermore, the sheet 1038a can restrain the balls 1039 from skidding or rolling under the influence of inertia. When the motor is stopped, the sheet 1038a can stop movement of the balls 1039.

In the example shown in FIG. 13, the sheet 1038a is positioned between the lower ends of the outer wall portion 1043b and the inner wall portion 1043c and the upper surface of the closing member 1038. The sheet 1038a is more elastic than the closing member 1038. Therefore, even if the rolling guide portion 1043 or the closing member 1038 has a dimensional error, the error is absorbed by the deformation of the sheet 1038a. This improves seal of the rolling guide portion 1043.

Figure 13A:
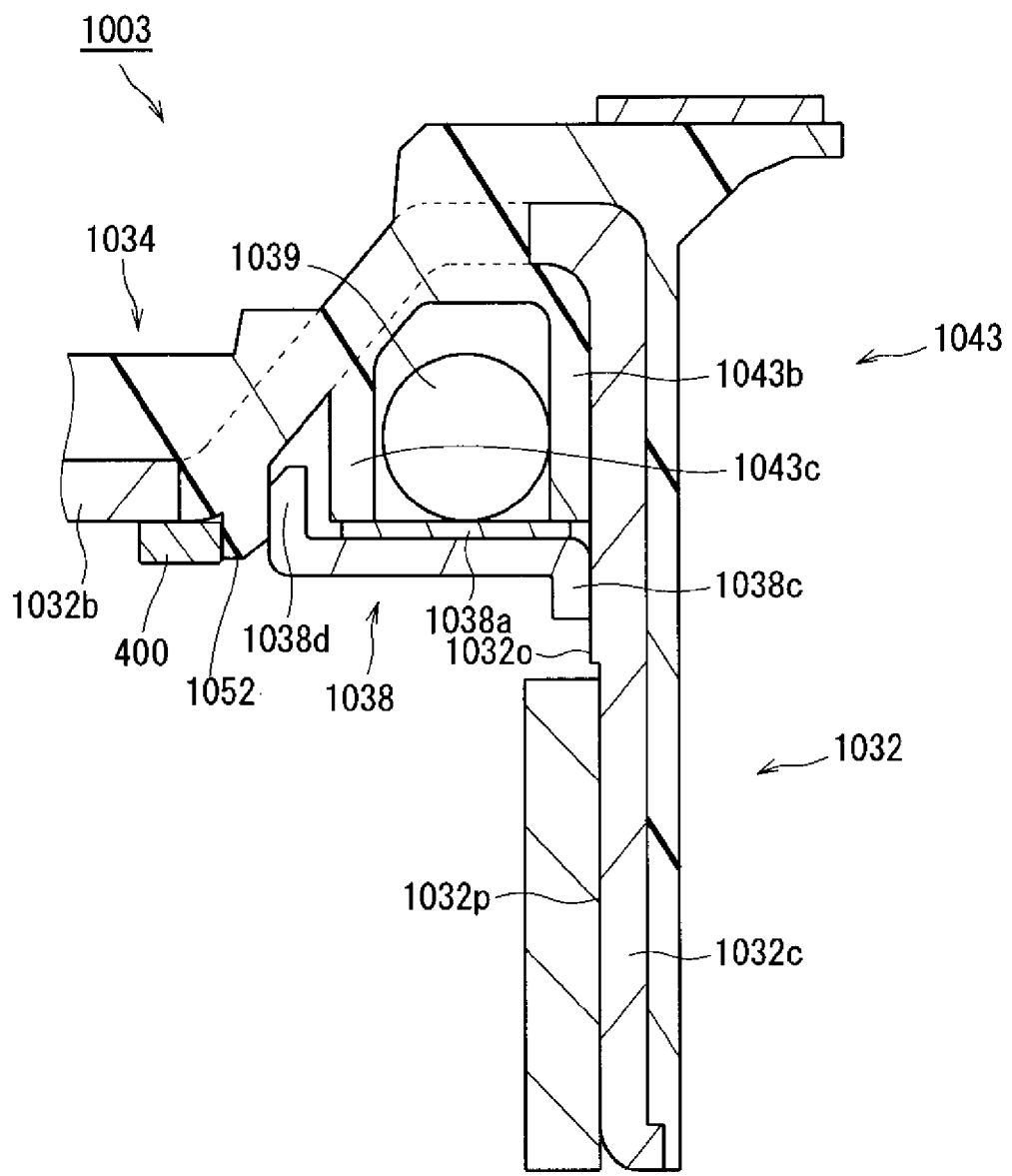
FIG. 13A is a partial vertical section view showing another example of the rotary unit.

FIG. 13A is a partial vertical section view showing a rotary unit 1003 whose structure is substantially the same as shown in FIG. 13. Referring to FIG. 13A, a preload magnet 400 is radially and axially brought into contact with the resin member 1034. The preload magnet 400 has an annular shape. The preload magnet 400 makes contact with the jut portion 1052 in the radial direction and with a portion of the resin member 1034 in the axial direction. Moreover, the preload magnet 400 remains in contact with a portion of the upper cover portion 1032b in the axial direction. With this arrangement, the position of the preload magnet 400 can be determined with respect to the resin member 1034 through the use of the jut portion 1052.

In the example shown in FIG. 13A, the preload magnet 400 is fixed to the resin member 1034 by use of an adhesive agent.

More specifically, an adhesive agent is interposed between the preload magnet 400 and the jut portion 1052. The adhesive agent is also interposed axially between the preload magnet 400 and the resin member 1034.

In the example shown in FIG. 13A, the preload magnet 400 makes contact with both the resin member 1034 and the upper cover portion 1032b in the axial direction. However, the preload magnet 400 may make contact with only the resin member 1034 in the axial direction without making contact with the upper cover portion 1032b.

Figure 14:
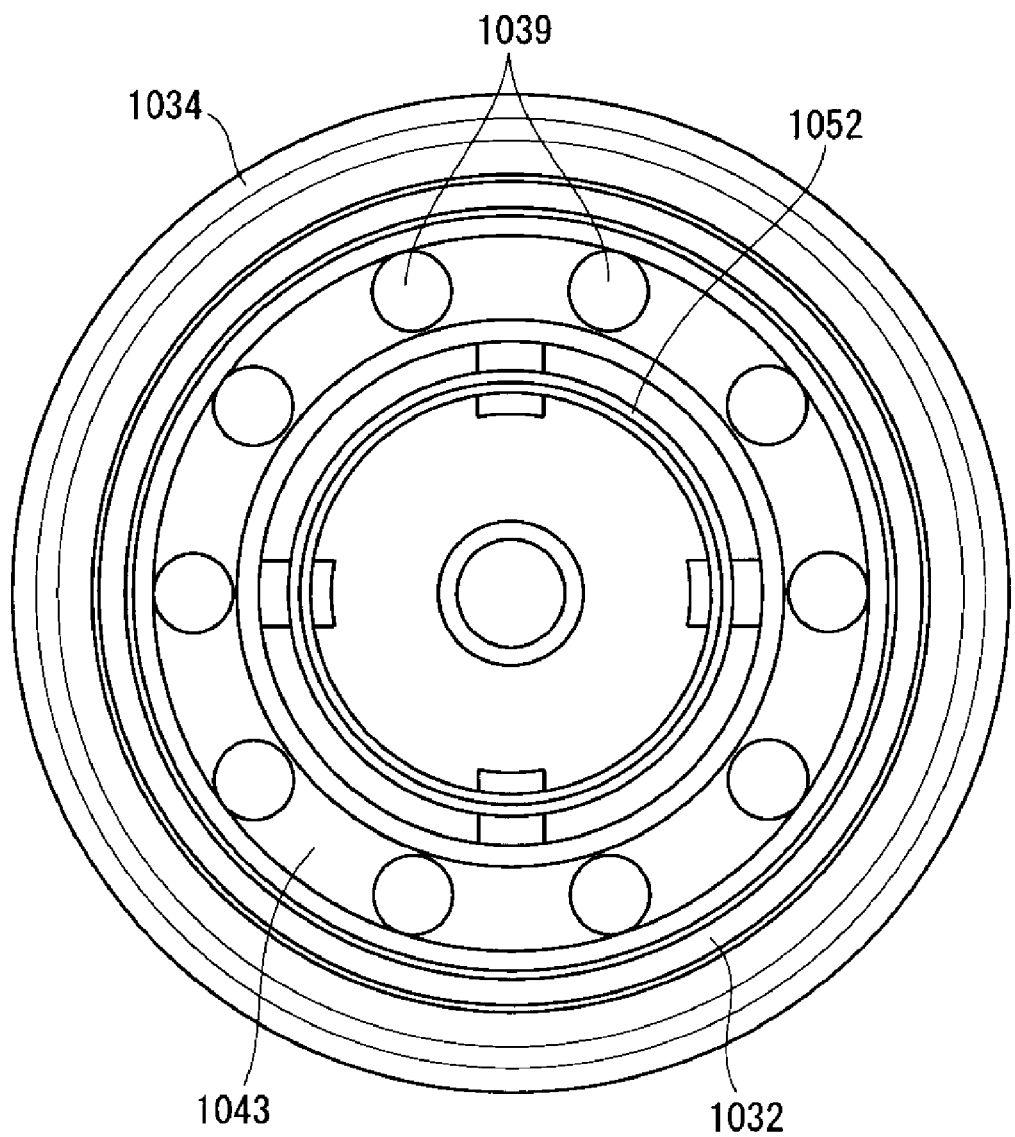
FIG. 14 is a bottom view showing a rotor holder, a resin member and a plurality of balls.

FIG. 14 is a bottom view showing the rotor holder 1032, the resin member 1034 and the balls 1039. In this example, the jut portion 1052 has a cylindrical shape extending continuously in the circumferential direction. This makes it possible to broaden the contact area between the jut portion 1052 and the closing member 1038 in the circumferential direction. Therefore, it is possible to fix the closing member 1038 to the jut portion 1052 in a stronger manner. Alternatively, the jut portion 1052 may have a shape with at least one cutout (e.g., a C-shape). In other words, the jut portion 1052 may include a plurality of jut segments spaced apart in a circumferential direction.

Figure 15:
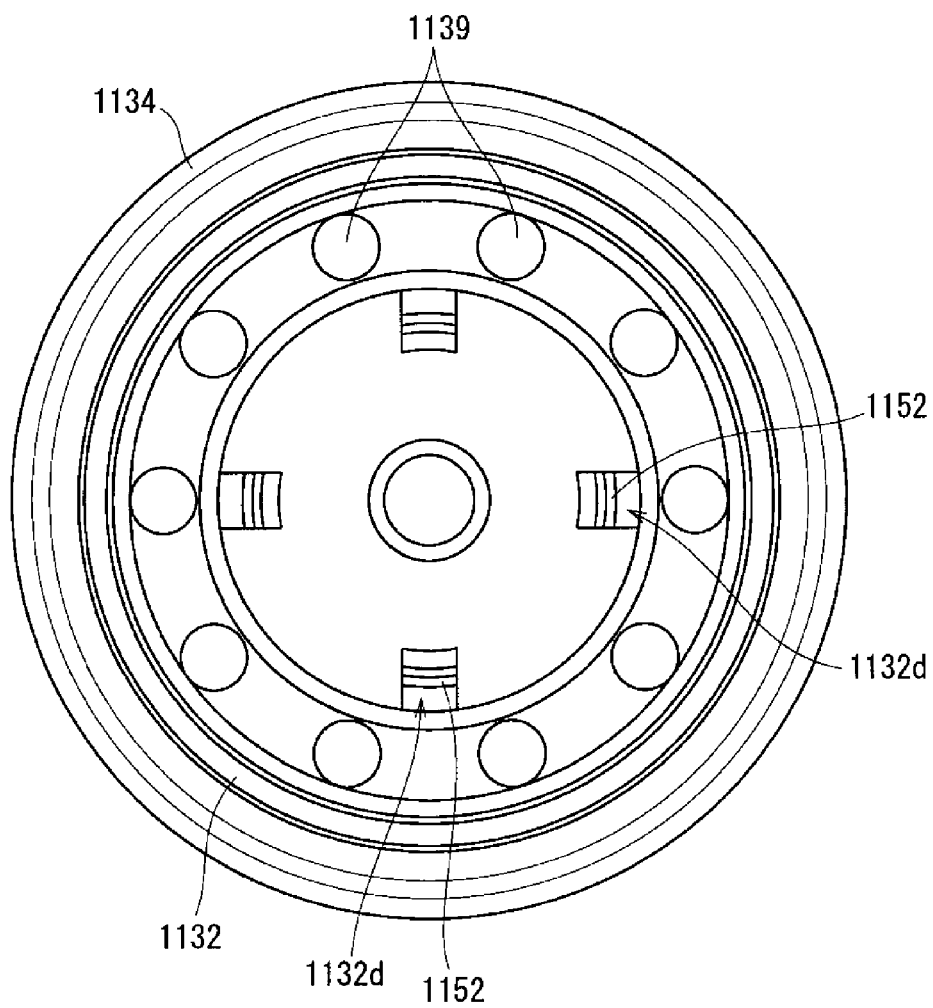
FIG. 15 is a bottom view showing a rotor holder, a resin member and a plurality of balls.

FIG. 15 is a bottom view showing a rotor holder 1132, a resin member 1134 and a plurality of balls 1139 according to another example. Unlike the example shown in FIG. 14, protrusion portions 1152 are provided only in the positions below the through-holes 1132d in the example shown in FIG. 15. In other words, a plurality of protrusion portions 1152 is arranged in a circumferentially spaced-apart relationship. This helps enhance the flexibility of the protrusion portions 1152. Therefore, even if the protrusion portions 1152 and the closing member 1138 have dimensional errors, the errors are absorbed by the deformation of the protrusion portions 1152. In the example shown in FIG. 15, the protrusion portions 1152 are arranged at an equal interval in the circumferential direction. Alternatively, the protrusion portions 1152 may be arranged at irregular intervals in the circumferential direction.

Figure 16:
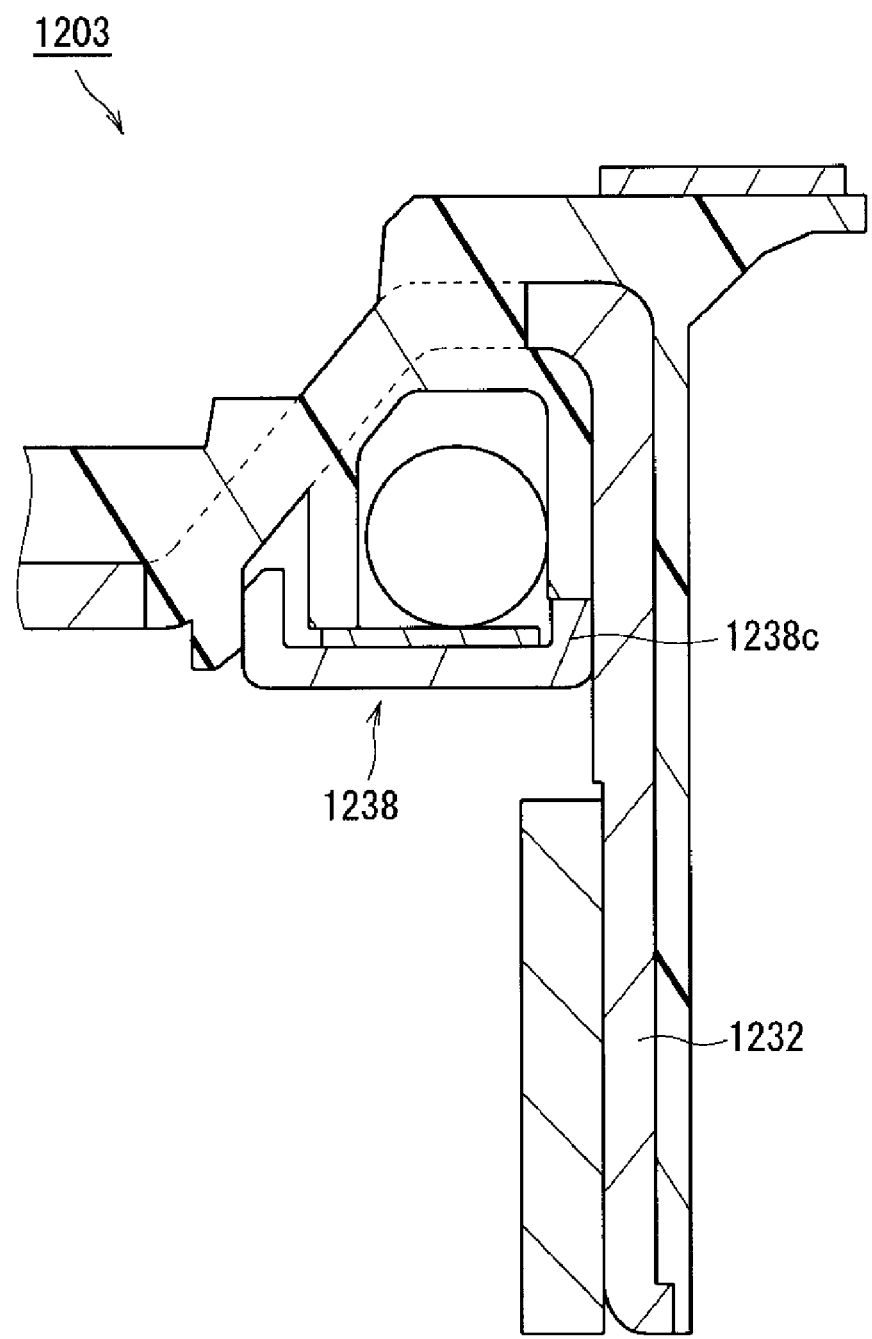
FIG. 16 is a partial vertical section view showing a further example of the rotary unit.

FIG. 16 is a partial vertical section view showing a rotary unit 1203 according to a further example. In the example shown in FIG. 16, an outer protrusion portion 1238c protrudes upwards from the outer circumferential portion of a closing member 1238. In this structure, the contact area between the rotor holder 1232 and the closing member 1238 is axially broader than when the outer protrusion portion 1238c is absent. Accordingly, the press-fitting strength of the rotor holder 1232 and the closing member 1238 becomes greater than when the outer protrusion portion 1238c is absent.

In other words, the outer protrusion portion may protrude either upwards or downwards from the outer circumferential portion of the closing member. If the outer protrusion portion 1038c protrudes downwards as in FIG. 13, the end of the outer protrusion portion 1038c does not face toward the interior of the rolling guide portion 1043. Thus, the particles such as burrs generated from the end of the outer protrusion portion 1038c are prevented from infiltrating into the internal space of the rolling guide portion 1043. Alternatively, outer protrusion portions may protrude both upwards and downwards from the outer circumferential portion of the closing member. For example, downwardly-protruding outer protrusion portions and upwardly-protruding outer protrusion portions may be arranged at an equal interval, at irregular intervals or alternately in the circumferential direction.

If the required fixing strength is attainable, there may be provided no outer protrusion portion in the outer circumferential portion of the closing member.

Figure 17:
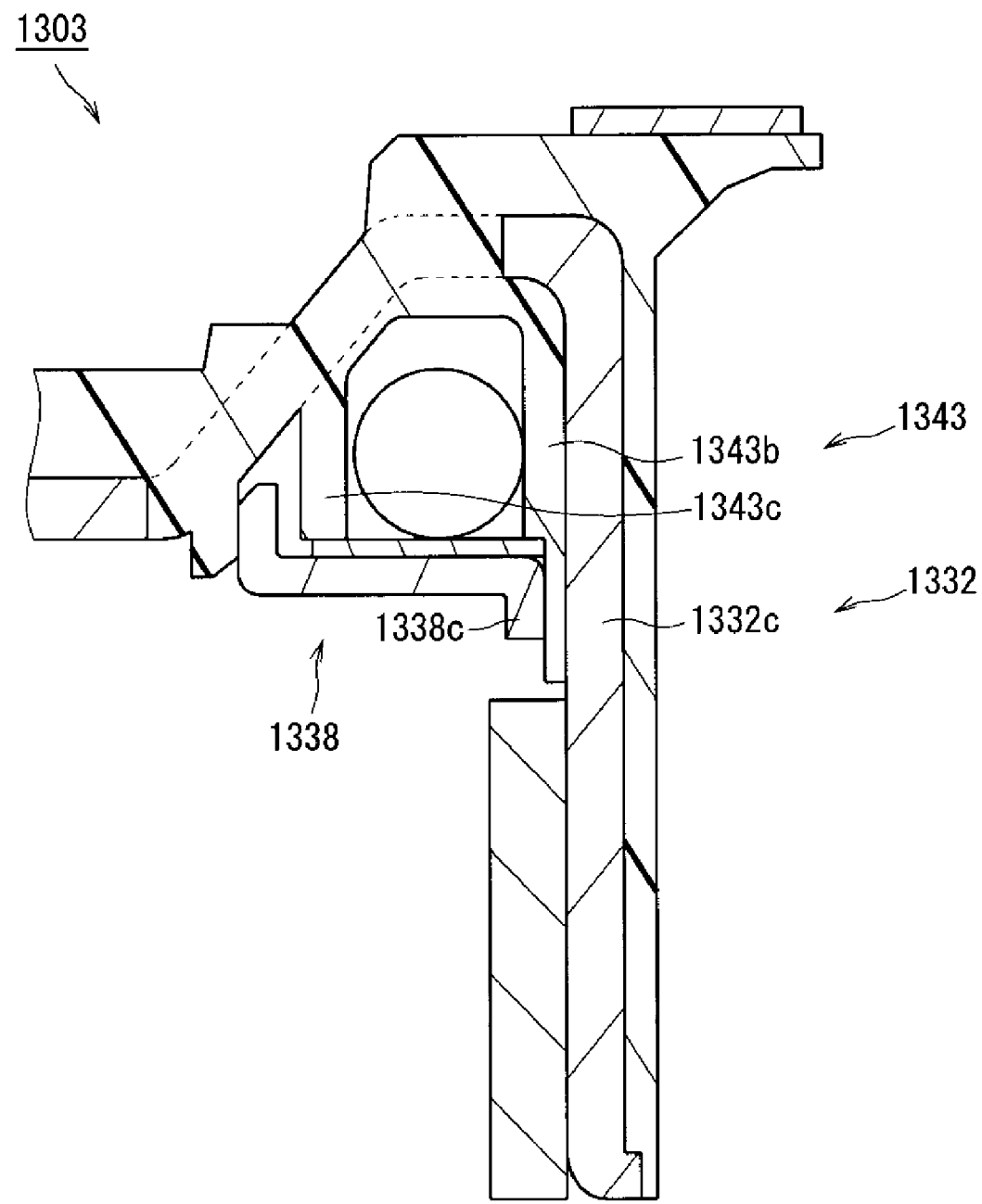
FIG. 17 is a partial vertical section view showing a still further example of the rotary unit.

FIG. 17 is a partial vertical section view showing a rotary unit 1303 according to a still further example. In the example shown in FIG. 17, the outer wall portion 1343b of the rolling guide portion 1343 extends downwards beyond the lower end of the inner wall portion 1343c. The outer protrusion portion 1338c of the closing member 1338 makes contact with the inner circumferential surface of the outer wall portion 1343b. In other words, the outer protrusion portion 1338c of the closing member 1338 is indirectly press-fitted to the cylinder portion 1332c of the rotor holder 1332 through the outer wall portion 1343b.

In the example shown in FIG. 17, the inner diameter of the cylinder portion 1332c of the rotor holder 1332 is greater than the outer diameter of the closing member 1338. Therefore, the closing member 1338 can be easily inserted inside the cylinder portion 1332c of the rotor holder 1332 at the lower side of the outer wall portion 1343b. This makes it possible to shorten the axial press-fitting distance of the closing member 1338 even if first and second inner circumferential surfaces differing in diameter are not formed in the cylinder portion 1332c of the rotor holder 1332. Accordingly, it is possible to readily press-fit the closing member 1338 to the rotor holder 1332.

Figure 18:
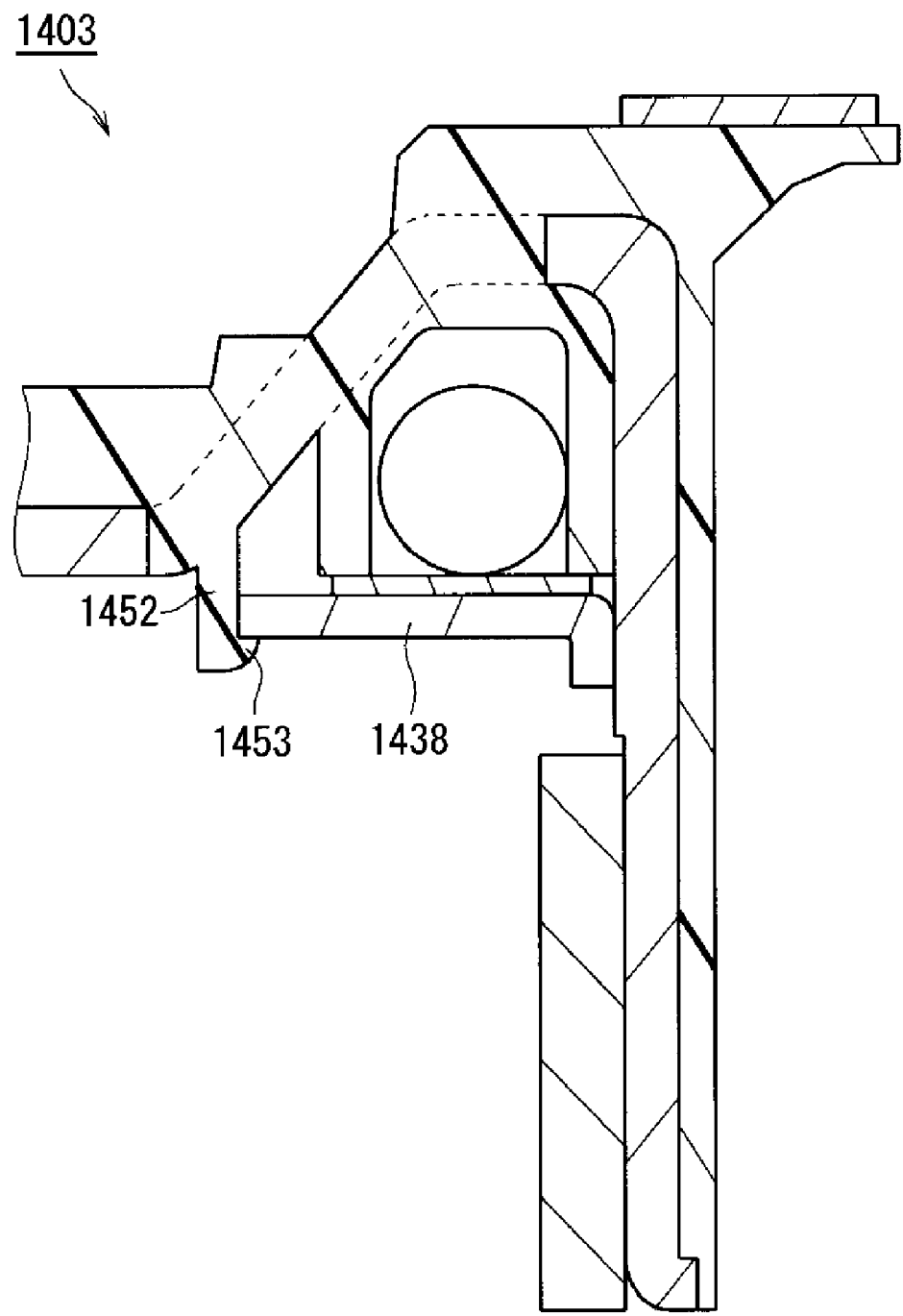
FIG. 18 is a partial vertical section view showing a yet still further example of the rotary unit.

FIG. 18 is a partial vertical section view showing a rotary unit 1403 according to a yet still further example. In the example shown in FIG. 18, a locking seat portion 1453 protruding radially outwards is formed in lower end of the jut portion 1452. The lower surface of the inner circumferential portion of the closing member 1438 makes contact with the upper surface of the locking seat portion 1453. In other words, the inner circumferential portion of the closing member 1438 is locked to the locking seat portion 1453. Removal of the closing member 1438 is hard to occur in this structure.

Figure 19:
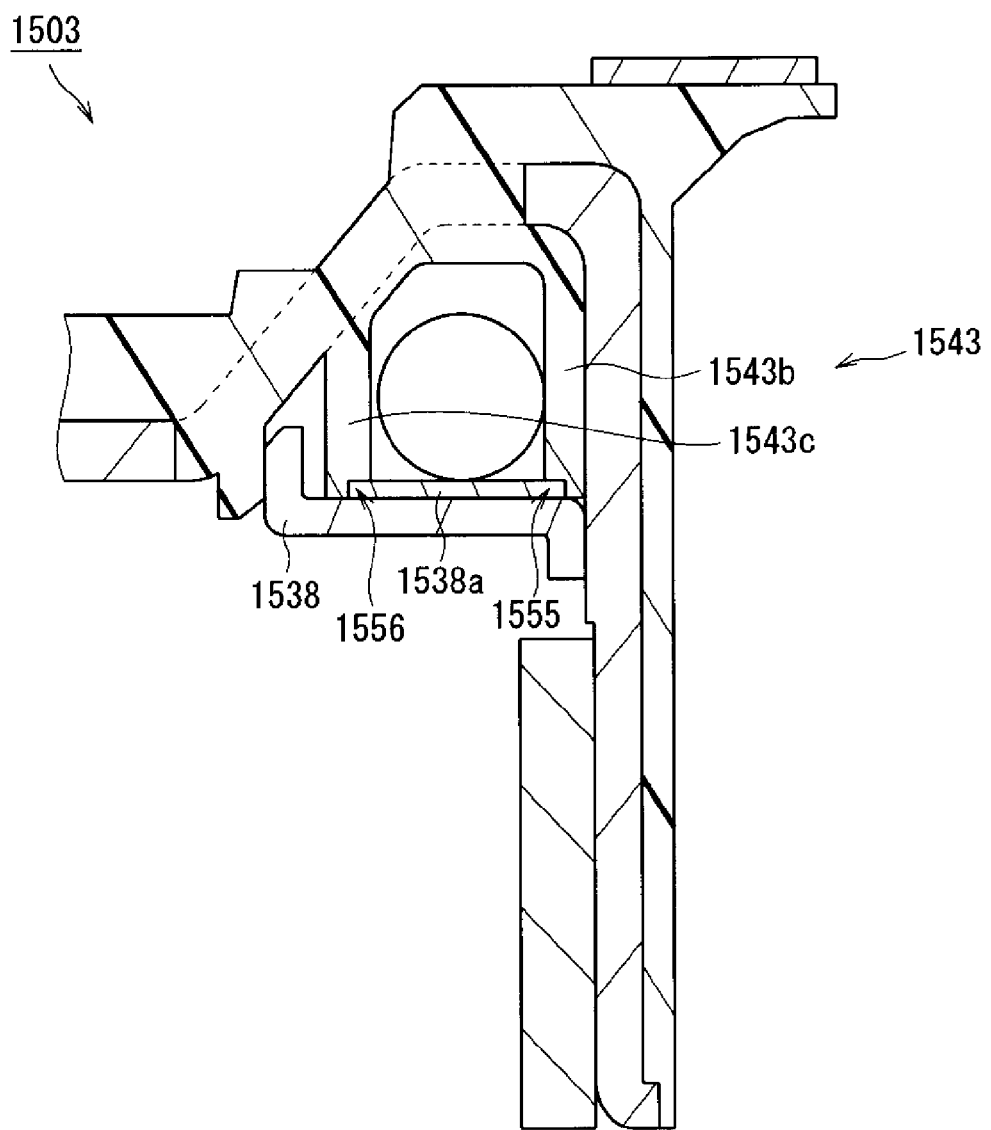
FIG. 19 is a partial vertical section view showing a yet still further example of the rotary unit.

FIG. 19 is a partial vertical section view showing a rotary unit 1503 according to a yet still further example. In the example shown in FIG. 19, step portions 1555 and 1556 are formed in the lower ends of the outer wall portion 1543b and the inner wall portion 1543c. The step portion 1555 is formed in the lower end area of the inner circumferential surface of the outer wall portion 1543b. The step portion 1556 is formed in the lower end area of the outer circumferential surface of the inner wall portion 1543c. The radial outer and inner end portions of the sheet 1538a are respectively received in the step portions 1555 and 1556. The upper surface of the closing member 1538 makes direct contact with the lower ends of the outer wall portion 1543b and the inner wall portion 1543c. This makes it possible to accurately determine the position of the closing member 1538 with respect to the rolling guide portion 1543. Alternatively, the step portions 1555 and 1556 may be a plurality of cutouts. In this case, a plurality of protrusions corresponding to the cutouts is formed in the sheet 1538a. The sheet 1538a is positioned in the lower ends of the outer wall portion 1543b and the inner wall portion 1543c with the protrusions brought into alignment with the cutouts.

Figure 20:
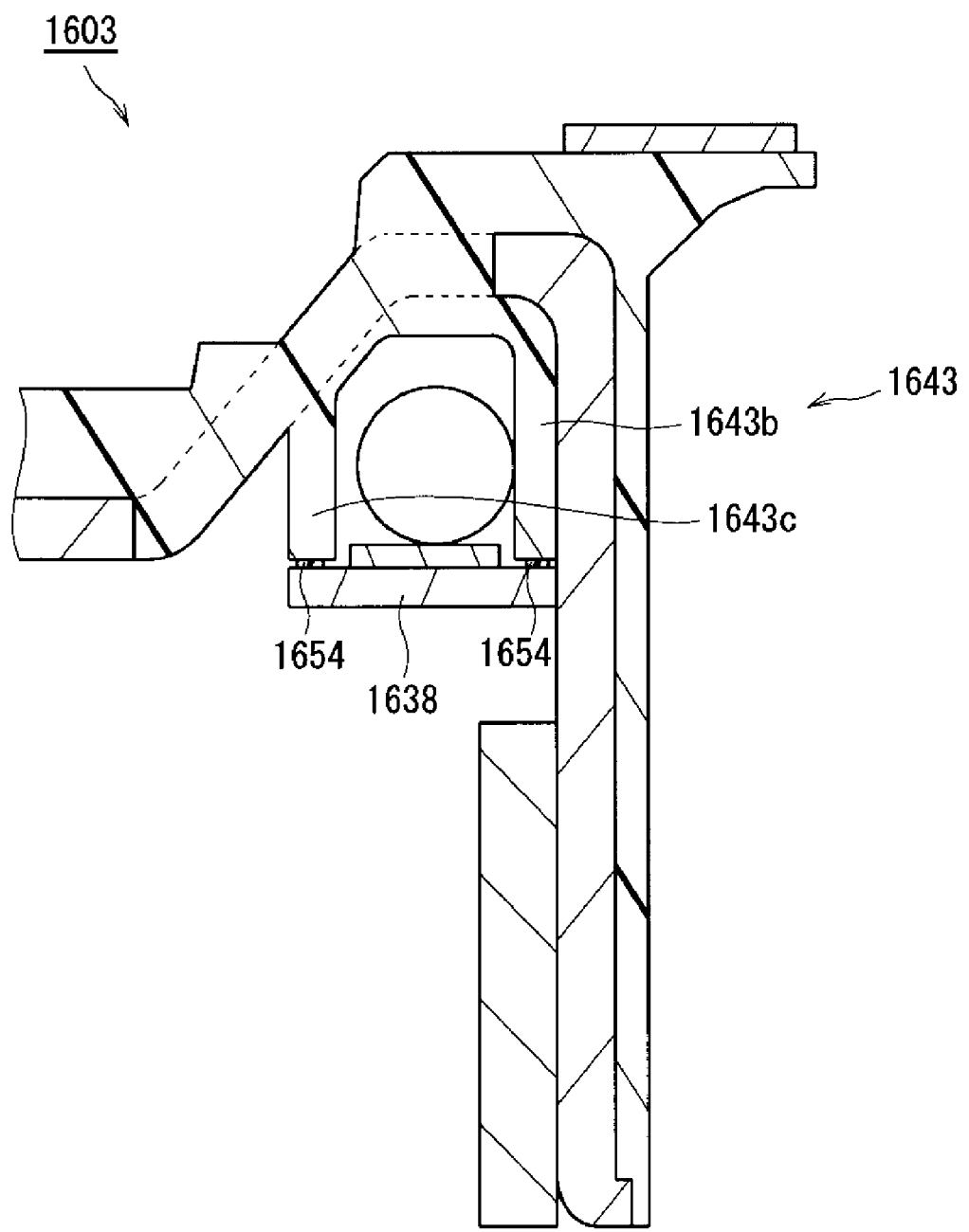
FIG. 20 is a partial vertical section view showing a yet still further example of the rotary unit.

FIG. 20 is a partial vertical section view showing a rotary unit 1603 according to a yet still further example. In the example shown in FIG. 20, the closing member 1638 is fixed to the rolling guide portion 1643 by means of an adhesive agent 1654. More specifically, the upper surface of the closing member 1638 is fixed to the respective lower surfaces of the outer wall portion 1643b and the inner wall portion 1643c through the adhesive agent 1654. This makes it possible to easily and strongly fix the rolling guide portion 1643 and the closing member 1638 together without having to accurately design the dimension or the shape of the rolling guide portion 1643 and the closing member 1638. Alternatively, at least one recess portion may be formed in at least one of the lower end of the outer wall portion 1643b and the lower end of the inner wall portion 1643c. The adhesive agent 1654 may be disposed in the recess portion. This makes it possible to restrain the adhesive agent 1654 from flowing into the rolling guide portion 1643 when the closing member 1638 is positioned on the lower surfaces of the outer wall portion 1643b and the inner wall portion 1643c. The recess portion may be a groove extending in the circumferential direction. The recess portion may be formed in the areas of the closing member 1638 opposing to the lower ends of the outer wall portion 1643b and the inner wall portion 1643c.

Figure 21:
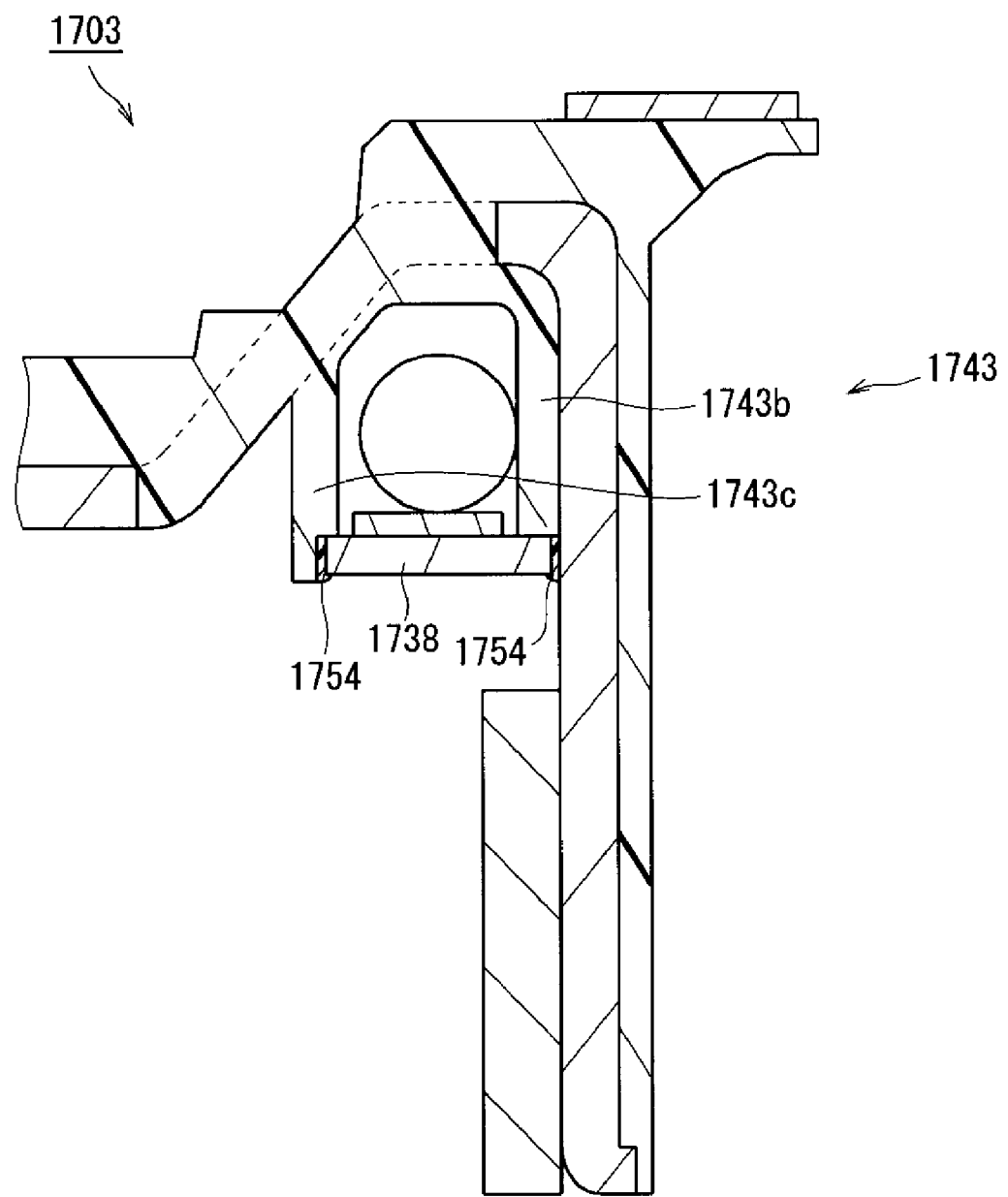
FIG. 21 is a partial vertical section view showing a yet still further example of the rotary unit.

FIG. 21 is a partial vertical section view showing a rotary unit 1703 according to a yet still further example. In the example shown in FIG. 21, the upper surface of the outer circumferential portion of the closing member 1738 makes contact with the outer wall portion 1743b of the rolling guide portion 1743. The upper surface of the inner circumferential portion of the closing member 1738 comes into contact with the inner wall portion 1743c of the rolling guide portion 1743. An adhesive agent 1754 is held between the outer and inner circumferential surfaces of the closing member 1738 and the surfaces opposing thereto. This makes it possible to restrain the adhesive agent 1754 from infiltrating into the rolling guide portion 1743. Just like the example shown in FIG. 20, at least one recess portion may be formed in at least one of the lower surface of the outer wall portion 1743b and the outer circumferential surface of the inner wall portion 1743c in the example shown in FIG. 21. By disposing the adhesive agent 1754 in the recess portion, it is possible to restrain the adhesive agent 1754 from flowing into the rolling guide portion 1743 when the closing member 1738 is positioned between the outer wall portion 1743b and the inner wall portion 1743c. The recess portion may be a groove extending in the circumferential direction. The recess portion may be formed in the areas of the closing member 1738 opposing to the lower ends of the outer wall portion 1743b and the inner wall portion 1743c.

6. Modified Embodiments

While one preferred embodiment of the present invention has been described hereinabove, the present invention is not limited the foregoing preferred embodiment. A variety of modified embodiments will now be described with emphasis placed on the points differing from the foregoing preferred embodiment.

Figure 22:
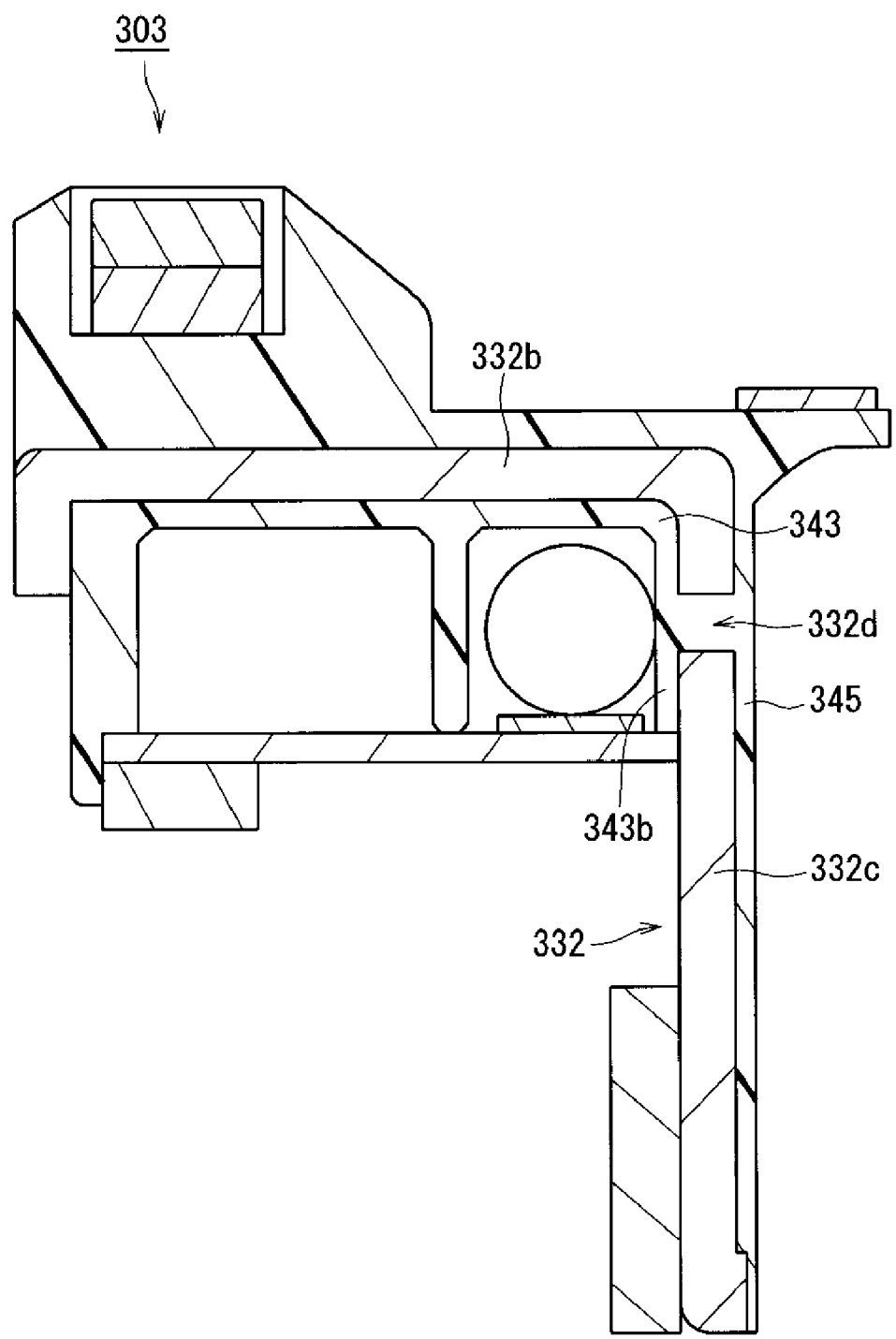
FIG. 22 is a partial vertical section view showing a yet still further example of the rotary unit.

FIG. 22 is a partial vertical section view showing a rotary unit 303 according to one modified embodiment. In the modified embodiment shown in FIG. 22, a through-hole 332d is defined in the cylinder portion 332c of the rotor holder 332. The rolling guide portion 343 and the covering portion 345 of the resin member 334 extend continuously through the through-hole 332d. With this structure, the outer wall portion 343b of the rolling guide portion 343 is formed near the through-hole 332d through which a resin can easily flow in the insert-molding process. This makes it possible to mold the outer wall portion 343b in a highly accurate manner. In case where the rotor holder is manufactured by press-forming, however, the manufacturing process becomes easier if the through-hole 32d is defined in the upper cover portion 32b as in the foregoing preferred embodiment.

Figure 23:
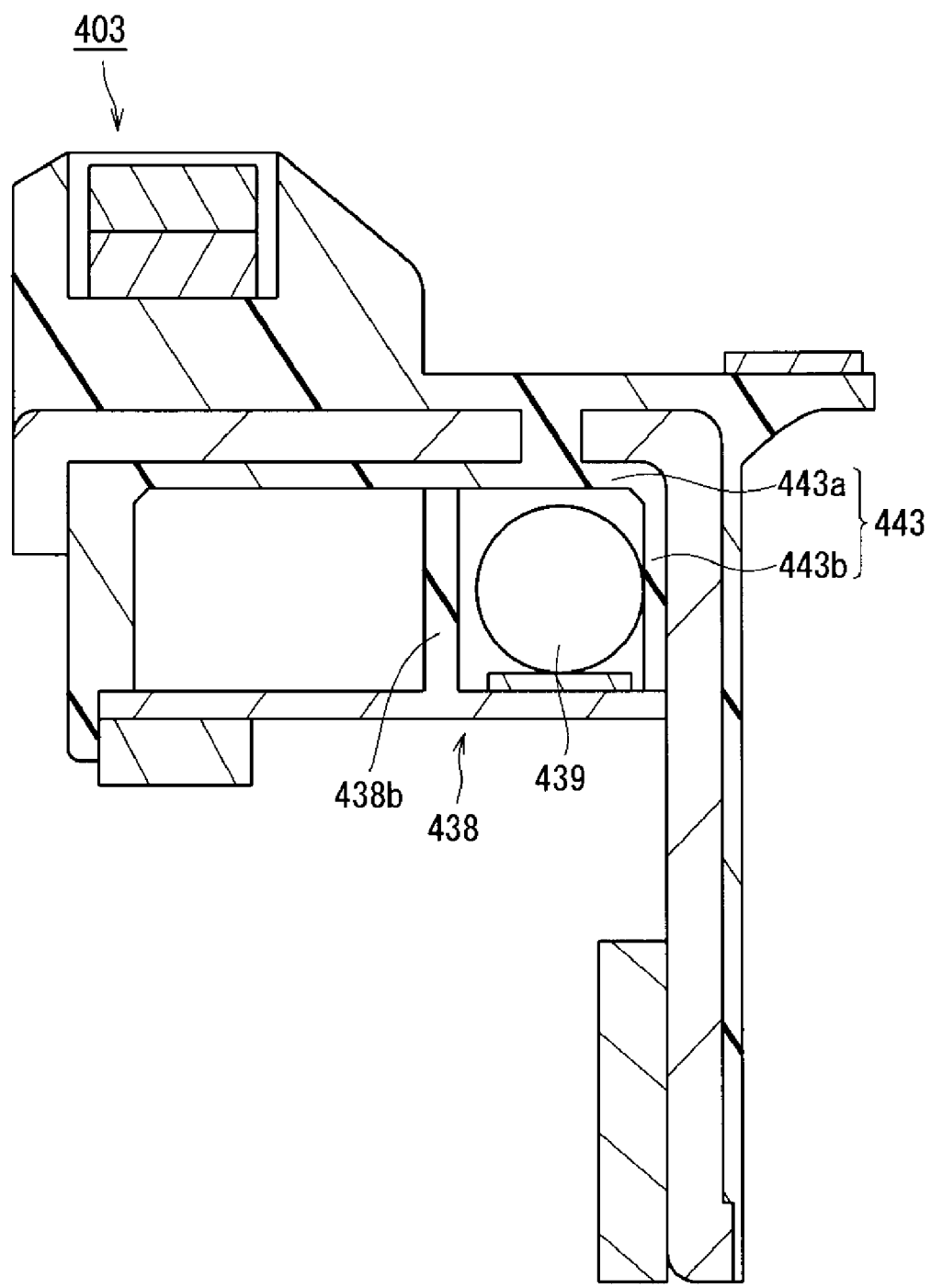
FIG. 23 is a partial vertical section view showing a rotary unit in accordance with one modified embodiment.

FIG. 23 is a partial vertical section view showing a rotary unit 403 according to another modified embodiment. In the modified embodiment shown in FIG. 23, the rolling guide portion 443 preferably includes a top panel portion 443a and an outer wall portion 443b. An inner wall portion 438b is formed as a portion of the closing member 438 and not a portion of the rolling guide portion 443. In this modified embodiment, an annular space within which a plurality of balls 439 make rolling movement can be defined by the rolling guide portion 443 and the closing member 438. However, the balls 439 can be more easily positioned within the rolling guide portion 443 if the rolling guide portion 43 is provided with the inner wall portion 43c as in the foregoing preferred embodiment.

Figure 24:
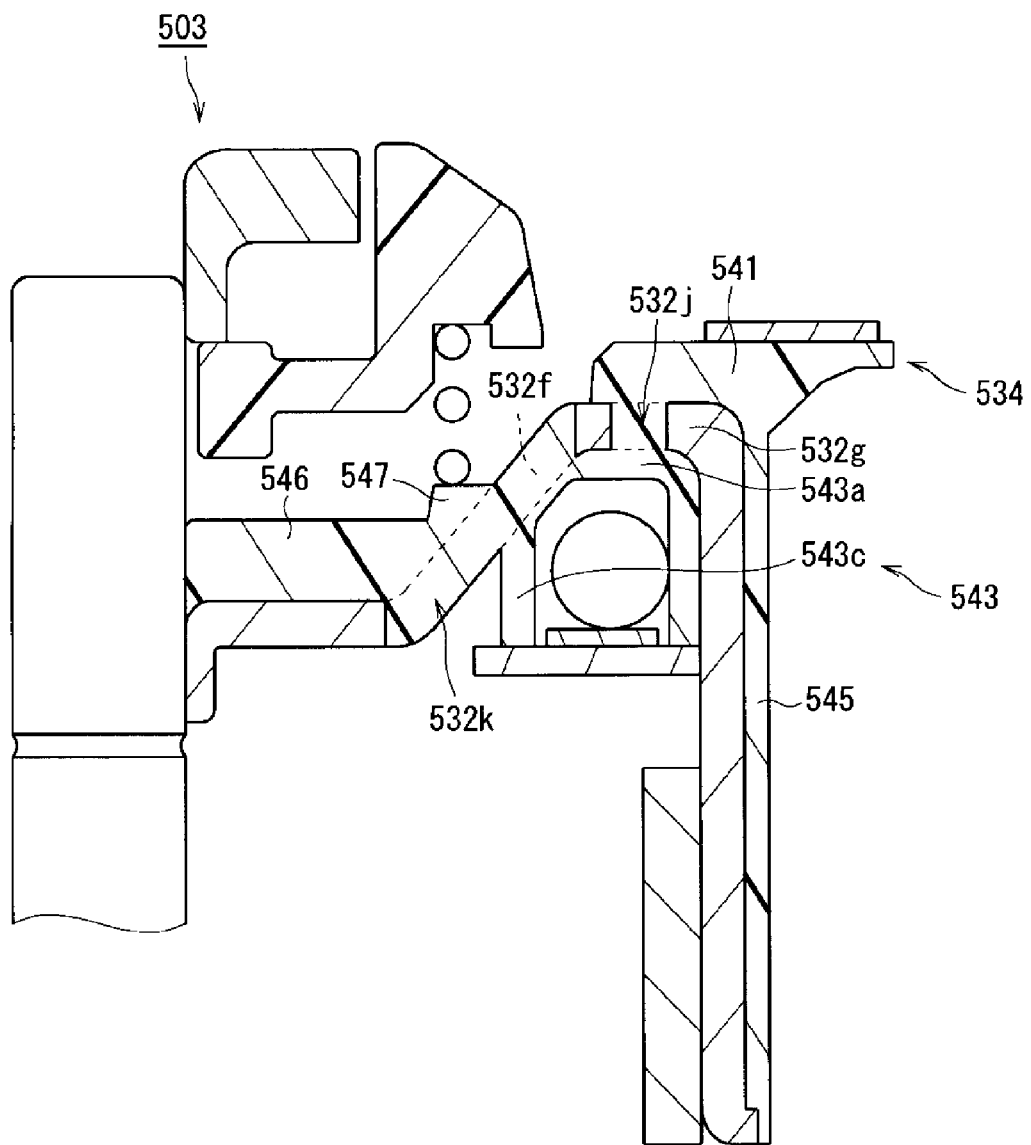
FIG. 24 is a partial vertical section view showing a rotary unit in accordance with a further modified embodiment.

FIG. 24 is a partial vertical section view showing a rotary unit 503 according to a further modified embodiment. The modified embodiment shown in FIG. 24 differs from the example shown in FIG. 10 in that the rotor holder includes first through-holes 532j and second through-holes 532k. The first through-holes 532j extend axially through the outer flat portion 532g. The second through-holes 532k extend axially through the inwardly downwardly inclined portion 532f. In order to reduce the deviation in the gravity center of the rotor holder, it is preferred that the first through-holes 532j and the second through-holes 532k be arranged at an equal interval in the circumferential direction. However, the first through-holes 532j and the second through-holes 532k may not always be arranged at an equal interval in the circumferential direction. Alternatively, the first through-holes 532j and the second through-holes 532k may be arranged at irregular intervals in the circumferential direction.

In the modified embodiment shown in FIG. 24, a turntable 541 and a rolling guide portion 543 extend continuously through the first through-holes 532j. The rolling guide portion 543, a central resin portion 546 and a spring rest portion 547 extend continuously through the second through-holes 532k. Consequently, the turntable 541, the rolling guide portion 543, the covering portion 545, the central resin portion 546 and the spring rest portion 547 make up a single resin member 534.

In the modified embodiment shown in FIG. 24, the second through-holes 532k are positioned above an inner wall portion 543c. In other words, the second through-holes 532k are positioned in an overlapping relationship with the inner wall portion 543c when seen in a plan view. Therefore, a liquid resin can flow between a top panel portion 543a and the inner wall portion 543c through the second through-holes 532k during the insert-molding process. This enables the resin to uniformly spread into both the top panel portion 543a and the inner wall portion 543c. Consequently, it is possible to strongly interconnect the top panel portion 543a and the inner wall portion 543c.

Figure 25:
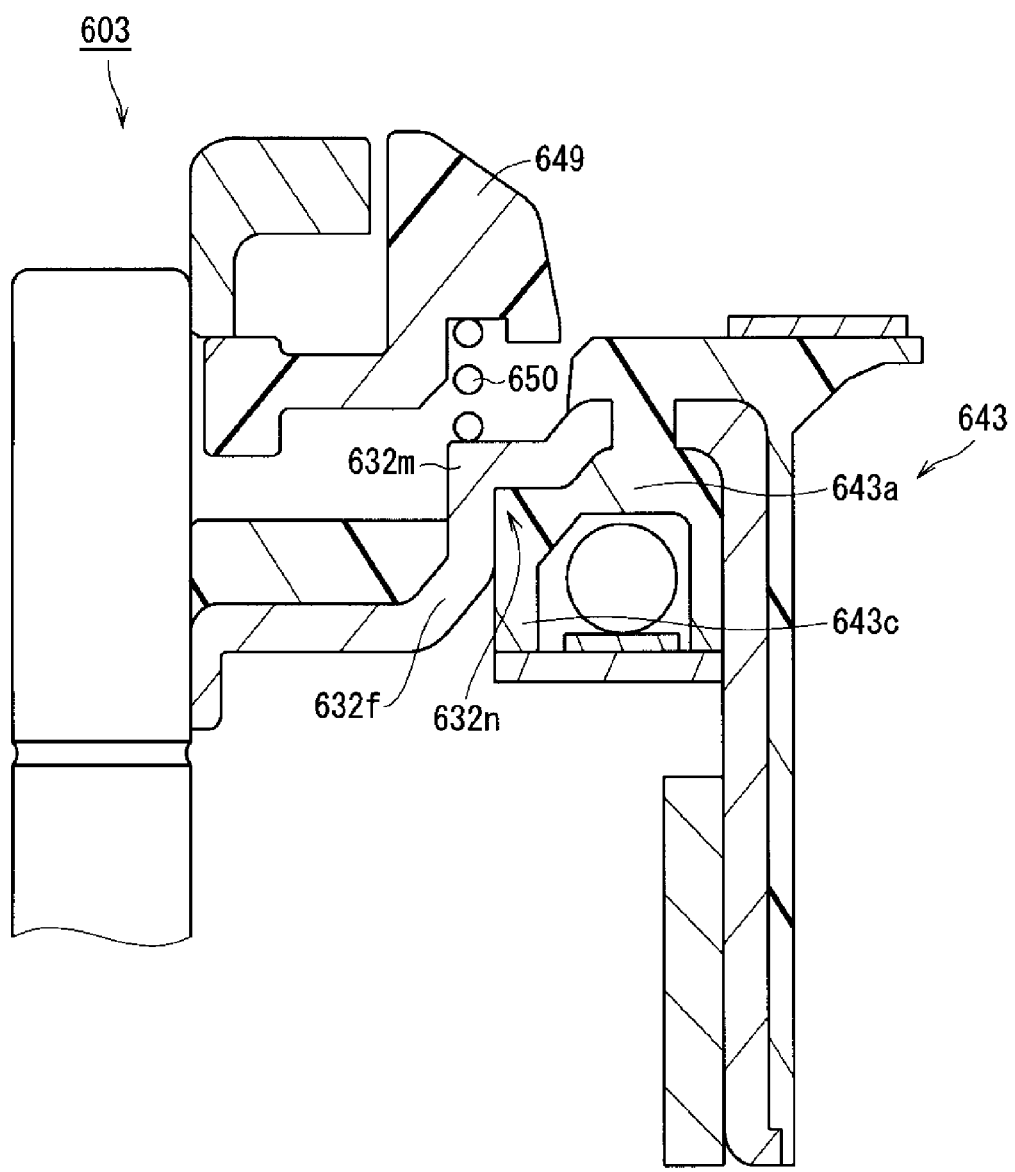
FIG. 25 is a partial vertical section view showing a rotary unit in accordance with a still further modified embodiment.

FIG. 25 is a partial vertical section view showing a rotary unit 603 according to a still further modified embodiment. In the modified embodiment shown in FIG. 25, a bend portion 632m is formed in an inwardly downwardly inclined portion 632f of a rotor holder 632. A spring member 650 is retained between a centering member 649 and the bend portion 632m. In the modified embodiment shown in FIG. 25, the upper surface of the bend portion 632m serves as a spring rest surface supporting the lower end portion of the spring member 650.

An annular groove 632n concentric with the center axis is defined on the lower surface of the bend portion 632m. The groove 632n is positioned radially inwards of the top panel portion 643a of the rolling guide portion 643 and above an inner wall portion 643c. In the insert-molding process, a liquid resin can flow between the top panel portion 643a and the inner wall portion 643c through the space defined within the groove 632n. The rolling guide portion 643 preferably includes a slant surface formed radially inwards of the top panel portion 643a and above the inner wall portion 643c, the slant surface being inclined with respect to the axial direction.

Figure 26:
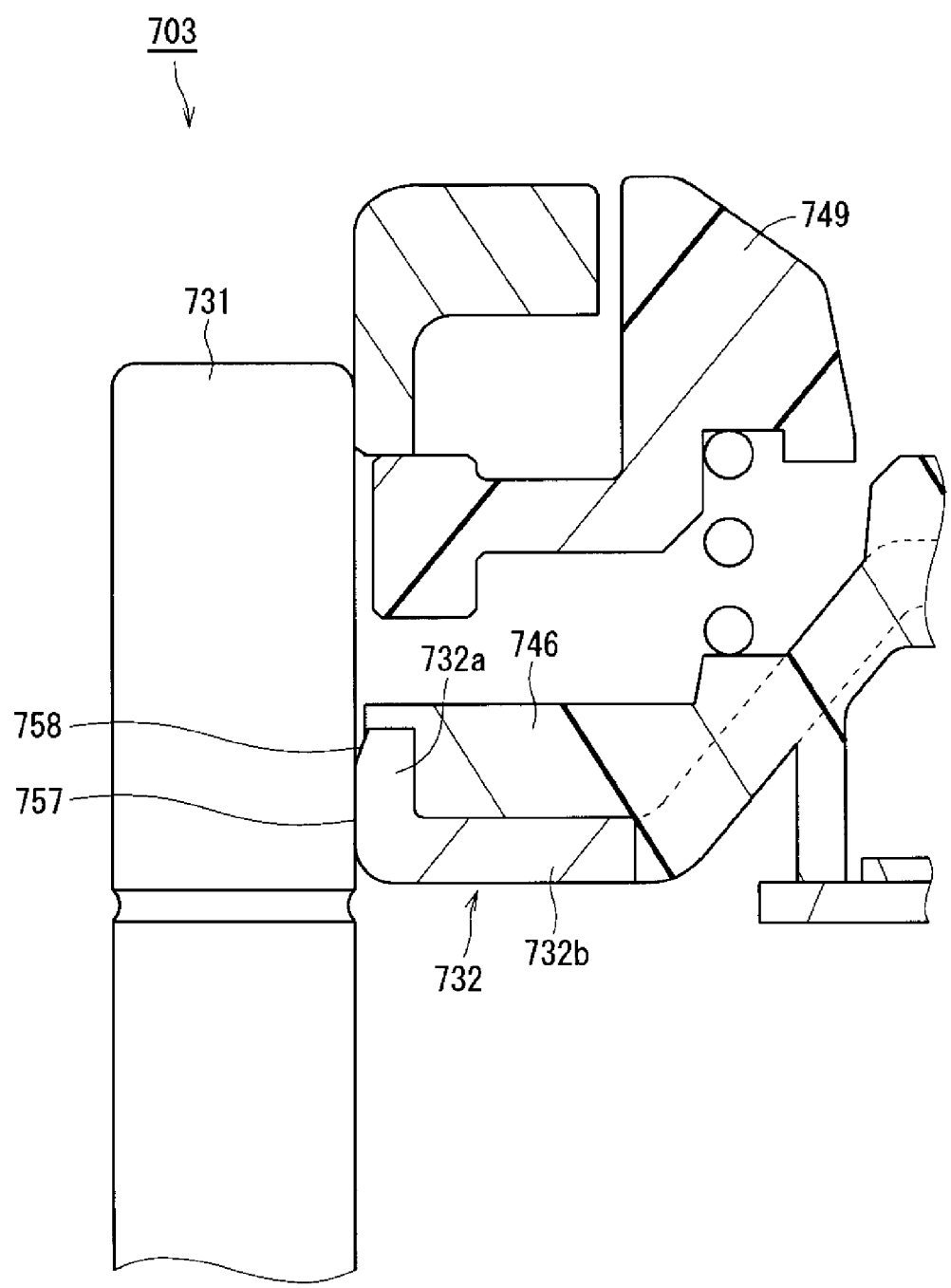
FIG. 26 is a partial vertical section view showing a rotary unit in accordance with a yet still further modified embodiment.

FIG. 26 is a partial vertical section view showing a rotary unit 703 according to a yet still further modified embodiment. In the modified embodiment shown in FIG. 26, a fastening portion 732a of a rotor holder 732 extends upwards from the radial inner end of an upper cover portion 732b. The inner circumferential surface of the fastening portion 732a preferably includes a cylindrical surface 757 and an opposing surface 758. The cylindrical surface 757 remains in contact with the outer circumferential surface of a shaft 731. At the upper end side of the fastening portion 732a above the cylindrical surface 757, the opposing surface 758 is opposed to the outer circumferential surface of the shaft 731 with a gap left therebetween. The opposing surface 758 is inclined with respect to the axial direction.

When the rotor holder 732 shown in FIG. 26 is fixed to the shaft 731, the shaft 731 is press-fitted inside the fastening portion 732a from below the fastening portion 732a. At this time, the cylindrical surface 757 of the fastening portion 732a makes contact with shaft 731. Consequently, it is sometimes the case that a metallic material is scraped upwards from the upper end of the cylindrical surface 757, thereby generating burrs. In the structure shown in FIG. 26, even if the burrs are generated, it is possible to accommodate the burrs in the space between the opposing surface 758 and the outer circumferential surface of the shaft 731. This makes it possible to restrain the burrs from protruding upwards beyond the upper end of the fastening portion 732a. As a result, it is possible to prevent the centering member 749 from being damaged by the burrs.

It is preferred that the average value of the gap between the opposing surface 758 and the outer circumferential surface of the shaft 731 be set smaller than the gap between the inner circumferential surface of the centering member 749 and the outer circumferential surface of the shaft 731. This helps restrain the burrs from protruding upwards through between the opposing surface 758 and the outer circumferential surface of the shaft 731.

If the gap between the inner circumferential surface of the central resin portion 746 and the outer circumferential surface of the shaft 731 is set small as in FIG. 26, it becomes easy to accommodate the burrs within the gap. In other words, the burrs can be accommodated not only inside the opposing surface 758 of the rotor holder 732 but also inside the inner circumferential surface of the central resin portion 746. It is preferred that the inner circumferential surface of the central resin portion 746 be positioned radially flush with the upper end of the opposing surface 758, radially inwards of the upper end of the opposing surface 758, or radially outwards of the upper end of the opposing surface 758. This makes it possible to accommodate the burrs inside the central resin portion 746 while suppressing the deformation of the central resin portion 746 which may be caused by the generation of the burrs.

Alternatively, the fastening portion of the rotor holder may extend downwards from the radial inner end of the upper cover portion. In this case, an opposing surface opposed to the outer circumferential surface of the shaft through a gap may be formed in the lower end extension of the fastening portion. In this case, the shaft can be press-fitted downwards from above. However, if the fastening portion is configured to extend upwards as in FIG. 26, the stationary bearing unit and the preload magnet can come closer to the lower surface of the upper cover portion than when the fastening portion is configured to extend downwards. This makes it possible to reduce the axial dimension of the motor.

The motor of the present invention may be used either to hold the optical disk as in the foregoing preferred embodiment and the modified embodiments or to hold other removable recording disks such as a magnetic disk and the like.

The respective elements or components employed in the foregoing preferred embodiment and the modified embodiments may be appropriately combined.

The present invention can find its application in a chucking device, a motor, a disk drive apparatus and a chucking device manufacturing method.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A chucking device, comprising:
   a rotor holder including a upper cover portion extending radially with respect to a vertically-extending center axis and a cylinder portion extending downwards from the outer edge of the upper cover portion;
   a turntable positioned above the upper cover portion and arranged to directly or indirectly support a disk from below;
   an annular rolling guide portion including a top panel portion contiguous to the lower surface of the upper cover portion and an outer wall portion contiguous to the inner circumferential surface of the cylinder portion of the rotor holder;
   a closing member arranged to close the rolling guide portion from below; and
   a plurality of balls positioned within an annular space surrounded by the rolling guide portion and the closing member to make rolling movement in a circumferential direction,
   wherein the turntable and the rolling guide portion are formed of a single resin member extending continuously through a through-hole defined in the rotor holder.

2. The chucking device of claim 1, wherein the through-hole is defined in the upper cover portion of the rotor holder.

3. The chucking device of claim 2, wherein the through-hole is positioned above the rolling guide portion.

4. The chucking device of claim 1, wherein the resin member further includes a substantially cylindrical covering portion arranged to at least partially cover the outer circumferential surface of the cylinder portion, the through-hole being defined in the cylinder portion.

5. The chucking device of claim 1, wherein the rolling guide portion further includes an inner wall portion extending downwards from the inner edge of the top panel portion.

6. The chucking device of claim 1, wherein the resin member further includes an inner annular portion positioned radially inwards of the rolling guide portion, the inner annular portion being contiguous to the lower surface of the upper cover portion.

7. The chucking device of claim 6, wherein the upper cover portion includes an outwardly downwardly inclined portion contiguous to the upper surface of the inner annular portion and extending radially outwards and downwards, the resin member further including a centering claw arranged radially inwards of the rolling guide portion and above the upper surface of the turntable to make contact with the inner circumferential portion of the disk.

8. The chucking device of claim 7, wherein the centering claw includes a lower surface kept out of contact with the upper surface of the upper cover portion, the through-hole being defined below the centering claw.

9. The chucking device of claim 6, further comprising:
   a shaft arranged to extend along the center axis, the upper cover portion including an opening defined in the central area thereof, the opening being greater in diameter than the shaft, the resin member extending continuously in a vertical direction through an interconnection portion formed inside the opening, the interconnection portion being fixed to the outer circumferential surface of the shaft.

10. The chucking device of claim 1, wherein the upper cover portion includes an inwardly downwardly inclined portion extending radially outwards and upwards, the rolling guide portion being arranged within an annular recess portion defined between the inwardly downwardly inclined portion and the cylinder portion of the rotor holder.

11. The chucking device of claim 10, wherein the rolling guide portion further includes an inner wall portion extending downwards from the inner edge of the top panel portion, the upper cover portion further including an outer flat portion arranged radially outwards of the inwardly downwardly inclined portion, the through-hole being defined to extend across the outer flat portion and the inwardly downwardly inclined portion, the inner wall portion being positioned to overlap with the through-hole when seen in a plan view.

12. The chucking device of claim 10, wherein the rolling guide portion further includes an inner wall portion extending downwards from the inner edge of the top panel portion, the upper cover portion further including an outer flat portion arranged radially outwards of the inwardly downwardly inclined portion, the through-hole including a first through-hole defined in the outer flat portion and a second through-hole defined in the inwardly downwardly inclined portion, the inner wall portion being positioned to overlap with the second through-hole when seen in a plan view.

13. The chucking device of claim 10, wherein the upper cover portion further includes an inner flat portion arranged radially inwards of the inwardly downwardly inclined portion, the resin member further including a central resin portion arranged above the inner flat portion and radially inwards of the inwardly downwardly inclined portion, the turntable, the rolling guide portion and the central resin portion extending continuously through the through-hole.

14. The chucking device of claim 10, further comprising:
a shaft arranged to extend along the center axis;
a centering member arranged to move up and down along the shaft; and
an axially-extendible pre-compression spring kept in contact with the lower surface of the centering member,
wherein the resin member further includes a spring rest portion arranged to make contact with the lower end portion of the pre-compression spring, and
the turntable, the rolling guide portion and the spring rest portion extend continuously through the through-hole.

15. The chucking device of claim 10, wherein the rolling guide portion further includes an inner wall portion extending downwards from the inner edge of the top panel portion, the inwardly downwardly inclined portion including a bend portion arranged to define an annular groove at the lower surface side thereof, the groove being concentric with the center axis, the groove being positioned above the inner wall portion and radially inwards of the top panel portion.

16. The chucking device of claim 15, further comprising:
a shaft arranged to extend along the center axis;
a centering member arranged to move up and down along the shaft; and
an axially-extendible pre-compression spring retained between the lower surface of the centering member and the upper surface of the bend portion.

17. The chucking device of claim 1, wherein the closing member includes an outer circumferential portion directly or indirectly fixed to the inner circumferential surface of the cylinder portion of the rotor holder.

18. The chucking device of claim 17, wherein the outer circumferential portion of the closing member is directly or indirectly press-fitted to the inner circumferential surface of the cylinder portion of the rotor holder.

19. The chucking device of claim 18, wherein the closing member includes an outer protrusion portion protruding axially from the outer circumferential portion of the closing member, the outer protrusion portion including an outer circumferential surface directly or indirectly press-fitted to the inner circumferential surface of the cylinder portion of the rotor holder.

20. The chucking device of claim 19, wherein the outer protrusion portion protrudes downwards.

21. The chucking device of claim 17, wherein the inner circumferential surface of the cylinder portion of the rotor holder includes a first inner circumferential surface arranged to make contact with the closing member and a second inner circumferential surface positioned below the first inner circumferential surface, the second inner circumferential surface being greater in diameter than the first inner circumferential surface.

22. The chucking device of claim 17, wherein the outer circumferential portion of the closing member remains in contact with the inner circumferential surface of the outer wall portion of the rolling guide portion.

23. The chucking device of claim 17, wherein the resin member further includes a jut portion positioned radially inwards of the rolling guide portion and extending downwards beyond the upper cover portion of the rotor holder, the inner circumferential portion of the closing member being fixed to the jut portion.

24. The chucking device of claim 23, wherein the jut portion includes a locking seat portion protruding radially outwards, the inner circumferential portion of the closing member being locked to the locking seat portion.

25. The chucking device of claim 23, wherein the inner circumferential portion of the closing member is press-fitted to the outer circumferential surface of the jut portion.

26. The chucking device of claim 25, wherein the closing member includes an inner protrusion portion protruding axially from the inner circumferential portion of the closing member, the inner protrusion portion including an inner circumferential surface press-fitted to the outer circumferential surface of the jut portion.

27. The chucking device of claim 23, wherein the jut portion has a circumferentially-extending cylindrical shape.

28. The chucking device of claim 23, wherein the jut portion includes a plurality of jut segments spaced apart in a circumferential direction.

29. The chucking device of claim 17, further comprising:
a sheet arranged on the upper surface of the closing member, the balls being arranged to make rolling movement along the upper surface of the sheet, the sheet being more elastic than the closing member.

30. The chucking device of claim 29, wherein the closing member makes contact with the rolling guide portion through the sheet.

31. The chucking device of claim 29, wherein the sheet includes an end portion received in a cutout defined in the lower end portion of the rolling guide portion, the upper surface of the closing member making direct contact with the lower end portion of the rolling guide portion.

32. The chucking device of claim 1, wherein the rolling guide portion and the closing member are fixed to each other by an adhesive agent.

33. The chucking device of claim 1, further comprising:
a shaft arranged to extend along the center axis, the rotor holder further including a substantially cylindrical fastening portion extending axially from the radial inner end of the upper cover portion, the fastening portion including an inner circumferential surface divided into a cylindrical surface and an opposing surface, the cylindrical surface being contiguous to the outer circumferential surface of the shaft, the opposing surface being positioned at the tip end side of the fastening portion above the cylindrical surface and opposed to the outer circumferential surface of the shaft through a gap.

34. The chucking device of claim 33, wherein the fastening portion extends upwards from the radial inner end of the upper cover portion.

35. A motor, comprising:
a stationary unit including a stator arranged to generate magnetic flux; and
a rotary unit including the chucking device of claim 1, the rotary unit further including a magnet radially opposed to the stator.

36. A disk drive apparatus, comprising:
the motor of claim 35;
an access unit arranged to perform at least one of information reading and writing tasks with respect to the disk held in the rotary unit of the motor; and
a housing arranged to accommodate the motor and the access unit.

37. A method for manufacturing a chucking device with a plurality of circumferentially-rolling balls, the method comprising:
disposing a rotor holder within a cavity defined between a pair of molds, the rotor holder including an upper cover portion extending radially with respect to a vertically-extending center axis and a cylinder portion extending downwards from the outer edge of the upper cover portion, at least one of the upper cover portion and the cylinder portion including a through-hole;
allowing a liquid resin to flow into the cavity;
solidifying the resin in the cavity to produce a resin member unified with the rotor holder; and
opening the molds and removing the rotor holder and the resin member unified together from the molds,
wherein, the resin member includes a turntable positioned above the upper cover portion and a substantially annular rolling guide portion, the rolling guide portion including a top panel portion joined to the turntable through the through-hole and contiguous to the lower surface of the upper cover portion and an outer wall portion contiguous to the inner circumferential surface of the cylinder portion of the rotor holder.

38. The method of claim 37, wherein the molds include a mirror-finished surface arranged to mold the inner circumferential surface of the outer wall portion.

* * * * *